(12) United States Patent
Nelissen et al.

(10) Patent No.: US 10,049,624 B1
(45) Date of Patent: Aug. 14, 2018

(54) CONTEXT SENSITIVE BACKLIGHT

(71) Applicant: Google LLC, Mountain View, CA (US)

(72) Inventors: Marco Nelissen, San Jose, CA (US); Mathias Marc Agopian, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/149,696

(22) Filed: May 9, 2016

Related U.S. Application Data

(63) Continuation of application No. 13/918,534, filed on Jun. 14, 2013, now Pat. No. 9,338,269, which is a continuation of application No. 12/044,323, filed on Mar. 7, 2008, now Pat. No. 8,487,918.

(51) Int. Cl.
| | |
|---|---|
| *G06F 3/038* | (2013.01) |
| *G09G 5/00* | (2006.01) |
| *G09G 3/34* | (2006.01) |
| *H04M 1/22* | (2006.01) |
| *G06F 1/32* | (2006.01) |

(52) U.S. Cl.
CPC ......... *G09G 3/3406* (2013.01); *G06F 1/3265* (2013.01); *G06F 3/038* (2013.01); *H04M 1/22* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 5,504,907 A * | 4/1996 | Stewart | G06F 1/3203 713/321 |
| 5,954,820 A | 9/1999 | Hetzler | |
| 7,605,782 B2 | 10/2009 | Park | |
| 7,953,448 B2 | 5/2011 | Pletikosa et al. | |
| 2003/0025679 A1 | 2/2003 | Taylor et al. | |
| 2005/0073446 A1 | 4/2005 | Lazaridis et al. | |
| 2007/0091056 A1 | 4/2007 | Okita | |
| 2007/0281747 A1 | 12/2007 | Pletikosa et al. | |
| 2008/0165116 A1 * | 7/2008 | Herz | G09G 3/3406 345/102 |
| 2009/0061841 A1 | 3/2009 | Chaudhri et al. | |
| 2009/0063274 A1 * | 3/2009 | Dublin, III | G06Q 30/02 705/14.1 |

\* cited by examiner

*Primary Examiner* — Stephen T Reed
(74) *Attorney, Agent, or Firm* — Shumaker & Sieffert, P.A.

(57) ABSTRACT

Systems and methods for controlling the lighted display of a mobile device are disclosed. The backlight of or active power supplied to a display is reduced or deactivated after a certain period based on the application running on the mobile device, rather than being a uniform deactivation time. The system and method can be used on a variety of mobile devices having a display screen.

14 Claims, 14 Drawing Sheets

CONTEXT SENSITIVE BACKLIGHT

CROSS-REFERENCE TO RELATED APPLICATIONS

This application is a continuation application of and claims priority to U.S. application Ser. No. 13/918,534, filed on Jun. 14, 2013, which claims priority to U.S. application Ser. No. 12/044,323, filed on Mar. 7, 2008, the entire contents of which are hereby incorporated by reference.

TECHNICAL FIELD

This document describes systems and techniques for modifying the backlight intensity of an electronic device, and more particularly for hand-held electronic devices such as electronic assistants, cell phones, and hybrid devices.

BACKGROUND

As the number and usefulness of electronic devices, particularly hand-held electronic devices, has increased, the power consumption/battery life of these devices has become an important aspect. Users, having more applications and computing power available, are using the devices for longer periods of time, and for a wider variety of uses. This has led to increased demand for longer periods of active operability before power failure, or longer periods between battery recharging.

One facet of the operability period is the extent to which the device is in active mode as opposed to standby mode. For example, a simple cell phone may be in active mode only when the keys are being pressed, a call is being made, or an incoming call is received, while the remainder of the time the simple phone may be in standby mode.

However, with increased functionality and applications, a user may use a more complex electronic device, such as a hand-held device or advanced cell phone, for a number of purposes. The more complex electronic devices may be used as a camera, to access weather or traffic reports, for telephone calls, to access the internet, to send and receive text messages, to check email, to play games, and for a variety of other possible uses. These uses all generally require that the electronic device be in active mode, and such increased use can shorten the effective period of operability before a battery recharge is required.

SUMMARY

One of the major power consumption features of an electronic device is the display. Electronic devices, such as a hand-held device or cell phone, may have a display that "lights up" or brightens (typically by a backlight or similar feature) when the device is in active mode. In order to save power, it is helpful to have the device only in active mode when it is actually in use by the user, and in standby mode (including a darkened display) when not in use. Current devices, such as cell phones, typically use a single delay time to put the device in standby mode following the last key press or the termination of a call. With an increasing variety of applications accessible on electronic devices, such a simple approach can lead to errors and user aggravation. For example, a web page may be called up on the device and the user may be reviewing the information. A set delay, measure from the time since the last key press, might darken the screen while the user is still in the middle of reviewing the information.

Systems and techniques are described here for controlling the reduction or deactivation of a backlight in an electronic device based on the current application operating on the device. Small electronic devices that include displays, such as an electronic assistant, a mobile phone, or other types of hand-held portable devices, can be used in a variety of locations with various lighting conditions. In order for the display on the electronic device to be easily read, the device can include backlighting that can allow for increased illumination of the display resulting in improved legibility. Many of these portable electronic devices can include a rechargeable battery as their power source, which can limit the period of active operability of the device between battery charges.

In one implementation, a computer-implemented method for context-sensitive lighting control of a display is describe that includes identifying an active application on a computing device, determining an expiration time that varies based on characteristics of the active application, confirming that no change in activity occurs while the expiration time period is passing, and reducing the lighting of a display upon the occurrence of the expiration time.

In certain aspects, the method may further include classifying the active application, and wherein the expiration time is calculated based on the application classification. Determining an expiration time may further include determining a position of movement of the device and determining the expiration time on the position of movement in addition to the characteristics of the active application. Determining an expiration time may include associating the application with a class of applications and obtaining an expiration time for the class of application.

In some aspects, reducing the lighting of a display may include extinguishing the backlighting of the display, or may include reducing the power provided to an active powered display. Confirming that no change in activity occurs while the expiration time period is passing may include confirming the lack of user input received by the device. The display may be the display of a hand-held electronic device.

In other aspects, the method may further include determining a keypad expiration time that varies based on characteristics of the active application, confirming that no change in activity occurs while the keypad expiration time period is passing, and reducing the lighting of a keypad upon the occurrence of the keypad expiration time. The method may also include overriding the reduction of the keypad expiration time such that the lighting of the keypad is not reduced upon passage of the keypad expiration time, and such override is based upon additional information concerning a specific instance of the running application. The specific instance of a running application may include a connection or connection attempt to a specified phone number.

In another implementation, a computer-implemented system is described that includes a display having a fully lighted mode and a less than fully lighted mode, an input interface to monitor the receipt of input to a device, a response generator to obtain an expiration time based on the active application of a device, wherein the expiration time varies based on the application, and a processor to measure the passage of time and confirm a lack of additional inputs during passage of the expiration time, and to instruct the display to change from fully lighted mode to less than fully lighted mode upon the passage of the expiration time. The system may further include a keypad having a fully lighted mode and a less than fully lighted mode, and wherein the processor also instructs the keypad to change from fully lighted mode to less than fully lighted mode upon the passage of a certain time.

In certain aspects, the input interface may receive information including the type of input received. The fully lighted mode may include the backlight being on and the less than fully lighted mode may include the backlight being off, or the fully lighted mode may include the backlight being fully powered and the less than fully lighted mode may include the backlight being less than fully powered.

In another implementation, a computer-implemented method for context-sensitive backlight deactivation is described that includes deactivating the backlight of a mobile display after a time delay that is based on the application running on the mobile device. The time delay may be calculated based on the type of application running. The time delay may include input from the user of the mobile device. The application running on the mobile device may include the active application displayed on the device display.

In another implementation, a computer-implemented method for context-sensitive lighting control of a display is described that includes identifying an active application on a computing device, determining an expiration time that varies based on characteristics of the active application, confirming that no change in activity occurs while the expiration time period is passing, reducing the lighting of a display upon the occurrence of the expiration time period, continuing to monitor for user input for an additional period of time, and determining a new expiration time period if user input is received during the additional period of time, wherein the new expiration time period is based on the time period until user input was received following termination of the expiration time.

In certain aspects, determining the new expiration time period may include adding a calculated value to the expiration time period to determine the new expiration time period. The calculated value may be based on an exponential function including the time period until user input was received following termination of the expiration time period.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
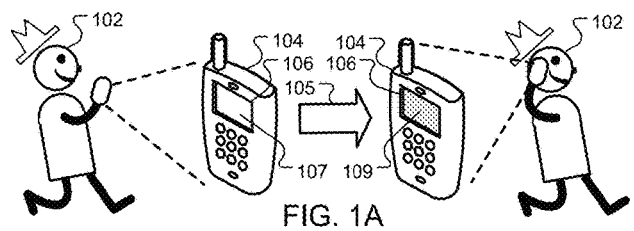
FIGS. 1A-1F show a number of scenarios in which a user can use a mobile device.

Portable electronic devices can include electronic assistants, mobile phones, or any other type of portable handheld devices. In one aspect, a user can hold or view the device, and enter input via a keyboard and/or pointing device to command the device to perform a desired function. Generally, such devices can perform various functions, including, but not limited to, making and receiving phone calls; web searching; web browsing; gaming; accessing online mapping services; managing a contacts list; and managing electronic mail. An example of a mobile device that can perform these and many other functions will be described in more detail with respect to FIG. 4.

In all cases where backlighting is discussed or described, such discussion also includes other comparable and equivalent displays. For example, rather than a backlight, the display may be an active matrix display wherein the brightness of a display is controlled by the amount of power supplied to the screen such that there is an active, brighter screen state, as well as a less active, reduced brightness state.

The use of backlighting can contribute to the amount of power drained from the device's battery. Therefore, it may be desirable to limit the amount of time the display is backlit. The backlighting may be reduced or turned off in response to device instructions. When the backlighting is reduced, it may be reduced in stages, or entirely at once. There may be two levels of backlighting (on/off), three levels (off, medium intensity, full intensity), higher multiple levels, or may feature a continuous/semi-continuous level control (dimmer-like).

The display may be backlit to improve visibility of the display, and to enable the user to have a better experience with the device and to be able to use the device in low-light conditions, etc. Backlighting of the display can be limited to occasions when the user needs to view the display in order to operate the device, or view information provided by the device. At other times, backlighting can be reduced or inactive, conserving battery power. Therefore, it can be beneficial for the electronic device to determine whether or not to activate display backlighting, and the amount of time the backlighting remains active, by determining the current mode of operation of the device.

The keypad may be backlit to improve visibility of the keys and to enable the user to have a better experience with the device and to be able to use the device in low-light conditions, etc. Backlighting of the keypad may be limited to occasions when the keypad is being used, but may be reduced or inactive to conserve battery power at other times. Therefore, it can be beneficial for the electronic device to determine whether or not to activate keypad backlighting, and the amount of time the keypad backlighting remains active, by determining the current mode of operation of the device.

The backlighting for the display and keypad may be independently controlled. Therefore, at times, the system may determine that the display backlight should remain active while the keypad backlight is reduced or inactive. As an example—when an address is entered, the device may determine that the display backlight should remain active for a longer period of time than the keypad backlight, as the user will be following the map for direction, but not have further need of entering key strokes.

In operating modes in which the device is executing an application that may require constant and/or frequent use of the display, the display backlighting can remain active until the application is no longer running on the device, or until a expiration time passes. Basing the active time of the display or keypad backlighting on the operating mode or active application of the electronic device may help insure that the user will have ample time to view the contents of the display without the need to manually (e.g., a key press) reactivate the display backlighting. However, by also incorporating an expiration time, the backlighting will not remain active for a prolonged period of time resulting in significant battery power consumption.

A user can initiate an application on a mobile device to perform a desired function. For example, a phone application can be initiated and run that can allow the user to make phone calls using the mobile device. It can be beneficial if the display screen and keypad of the mobile device can be easily viewed by the user in order for them to initiate and run the application. Also, it may be desirable for the user to view the display screen while the application is performing the selected function. However, viewing the keypad throughout the time period of performing the selected function may not be as important. However, the amount of time the user may need to view the display screen can vary widely dependent upon the function being performed. For example, the display screen can be viewable while a user is entering a phone number, when making a phone call, but need not be viewable while they are talking on the phone.

Furthermore, the time that a keypad may remain backlit may vary within the type of function being performed or application running.

In another example, the display screen can be viewable during the time needed to access and view an online map as well as a period of time after the map is displayed in order for the user to identify a route to follow or to check their desired destination. As uses and needs are different, the amount of time needed for a user to utilize one application can be less than that for a different application.

The display screen backlighting can be controlled to better enable active backlighting while the user needs to view the display screen and reduced/inactive at times when this is no longer necessary. As described, however, this period of time can be different dependent upon the function being performed by the mobile device. Therefore, a mobile device that can control the activation and deactivation of the backlighting of a display screen can conserve battery power while allowing the user the ability to view their display screen for a desirable period of time for the mobile device function being performed.

In another aspect, the backlighting of either the display or keypad may be modified based on the response of the user. For example, once the device has determined that the backlighting should be reduced or turned off, the device continues to monitor for the next keypad/keypress. If this happens more rapidly than a determined time period for the current function/application, the system will determine that the time delay was insufficient. This approach allows the device to determine that turning off or reducing the backlighting likely interrupted or distracted the user, and therefore the delay should be increased to reflect that the user appears to be actively using the device. Therefore, the system will increase the delay. In one approach, the device will increase the delay time based on the speed of the user response, such as by using an exponential function to determine the desired increase.

As an example, if the mobile device is currently in a text messaging application and has determined an expiration delay time for the keypad and display backlighting. After the delay time passes since the last input or text message received, the device will reduce the backlighting. The device will continue to monitor the keypad for an additional time. This additional time may be a set period for any application (such as, for example, 10 seconds), may vary based on the application (such as, for example, 5 seconds for a phone application, 10 seconds for a text messaging application), or may be based on the determined expiration delay time (such as, for example, 50% of the delay time, or equal to the delay time). If the user presses a key during this additional monitoring period, the system will restore the backlighting, and also further determine that the expiration delay time previously used was insufficient and incorrect. The expiration delay time will then be recomputed based on the additional information of how long the user took to respond or press an additional key.

In one approach, the increase in expiration time will vary based on the actual time that the user required for the additional keypress. Thus, in one calculation, the faster that the user responded following the backlighting reduction, the closer the recalculated time will match the actual user required time. For example, if the user responded 1 second after the backlighting was reduced, the recomputed delay time will be increased nearly 1 second over the prior delay time. However, if the user responded 10 seconds after the backlighting was reduced, the user is likely less active/may be an erroneous press/etc., and so the recomputed delay time will be increased by less than 10 seconds, and perhaps significantly less than 10 seconds. In one approach, the increase in delay time will be based on an exponential calculation that includes the actual time that the user required for an additional keypress and the range of the additional time monitored.

In another approach, the recalculated time will be increased for longer periods of time when there is a faster response time by the user. For example, if the user responds immediately following reduction of the backlighting, the device will determine that the user is very active and increase the backlight expiration time by a large amount (such as, for example, a 50% or 100% time period increase), while if the user responds more slowly, such as near the end of the monitoring time, the device will determine that the user is not very active and will increase the expiration time only a small amount (such as, for example, by 5%). In one approach, the time period increase is based on an exponential function of the time period that the user allowed to pass. The function may also include the previous calculated expiration delay time, or the default expiration delay time for the application currently running on the device.

FIG. 1 shows a number of scenarios in which a user can use a mobile device.

FIG. 1A shows a scenario in which a user 102 can make and receive phone calls on a mobile device 104. For example, the user 102 can activate a phone application on the mobile device 102. As shown in FIG. 1A, the backlighting of the display 106 can be active, as shown on screen 107, when the user 102 is initiating the phone call (e.g., entering the phone number). A period of time later, when the user 102 is talking on the mobile device 104, the backlighting of the display 106 can be inactive, as shown on screen 109. The control of the backlighting (the amount of time 105 it is activated) can be based on the application being run by the mobile device (e.g., the phone application). The backlighting of the keypad may also be controlled at the same time or separately from the display backlighting. For example, the keypad backlight may be active when the user is initiating the call, and then reduced when the connect/call button is pressed.

As another example, some phone calls may require no additional keypad use once the phone number has been entered and the call/connect button pressed on the phone. However, other types of phone calls may require additional use of the keypad (e.g. when calling an automated phone system, when calling for stock quotes or game scores, etc.). Therefore, in one aspect, the mobile device may determine that a phone call to a certain number may require additional keypad use. The device may determine this by receiving a signal from the system associated with the phone number called, or the device may retain information in memory that is associated with prior phone numbers dialed. For example, when additional key presses are used during a call to a specified phone number, the device may store that information, and when that specified number is called in the future, the device may keep the keypad backlit during the call rather than reducing the backlight. Alternatively, the device may only reduce the keypad backlight during the call to that number rather than turning the backlighting off.

Figure 1B:
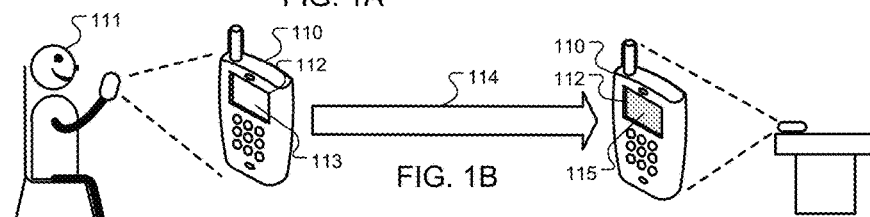

FIG. 1B shows a scenario in which a user 111 can search the web on a mobile device 110. For example, the user 111 can activate a search application on the mobile device 110. As shown in FIG. 1B, the backlighting of the display 112 can be active, as shown on screen 113, while the user 111 is searching the web (e.g., entering a web page address, viewing web page content, etc.). A period of time later, the backlighting of the display 112 can be set to inactive, as shown on screen 115. The control of the backlighting (the amount of time 114 it is activated) can be based on the application being run by the mobile device (e.g., searching application). As shown in FIG. 1B, the backlighting activation time 114 can be greater than the activation time 105 as the amount of time a user may browse the web can be greater than the amount of time needed to initiate a phone call. The backlighting of the keypad may also be controlled at the same time or separately from the display backlighting. For example, the keypad backlight may be active when the user is typing, and then reduced after a short time while the search results are displayed.

Figure 1C:
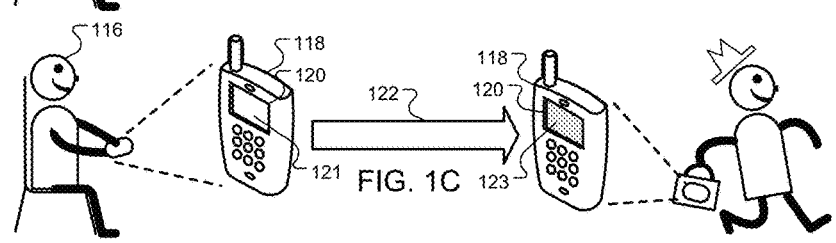

FIG. 1C shows a scenario in which a user 116 can be composing and sending a text message on a mobile device 118. For example, the user 116 can activate a text messaging application on the mobile device 118. As shown in FIG. 1C, the backlighting of the display 120 can be active, as shown on screen 121, while the user 116 is initiating and composing a text message (e.g., selecting a phone number to send the text message to, entering the text, sending the message, etc.). A period of time later, when the text message has been composed and sent, the backlighting of the display 120 can be inactivated, as shown on screen 123. The control of the backlighting (the amount of time 122 it is activated) can be based on the application being run by the mobile device (e.g., text messaging). As shown in FIG. 1C, the backlight activation time 122 can be greater than the activation time 105 as the amount of time a user may need to compose and send a text message can be greater than the amount of time needed to initiate a phone call. The backlighting of the keypad may also be controlled at the same time or separately from the display backlighting. For example, the keypad backlight may be active when the user is typing on the keypad, and then reduced when the message is sent.

Figure 1D:
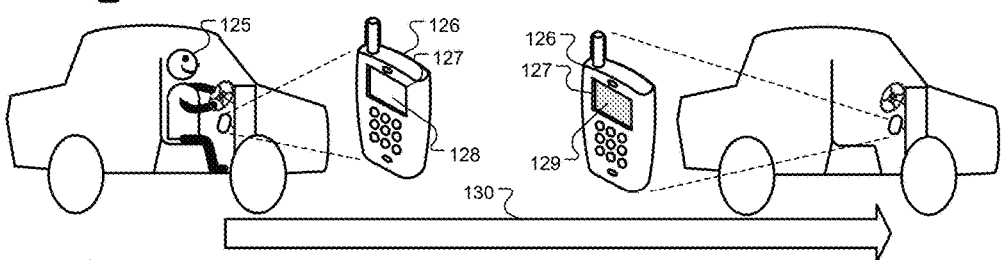

FIG. 1D shows a scenario in which a user 125 can be viewing a map and following directions displayed on a mobile device 126. For example, the user 125 can activate a map application on the mobile device 126. As shown in FIG. 1D, the backlighting of the display 127 can be active, as shown on screen 128, as the user 125 is initiating the map application and viewing the map and directions (e.g., entering start and destination locations, zooming in to view details of the map, etc.). A period of time later, the backlighting of the display 128 can be inactive, as shown on screen 129. The control of the backlighting (the amount of time 130 it is activated) can be based on the application being run by the mobile device (e.g., mapping application). As shown in FIG. 1D, the backlight activation time 130 can be greater than the activation time 105 as the amount of time a user may need to enter information into a mapping application and view the resulting map and directions can be greater than the amount of time needed to initiate a phone call. The backlighting of the keypad may also be controlled at the same time or separately from the display backlighting. For example, the keypad backlight may be active when the user is typing, and then reduced after the map loads and the user is viewing the map information.

Figure 1E:
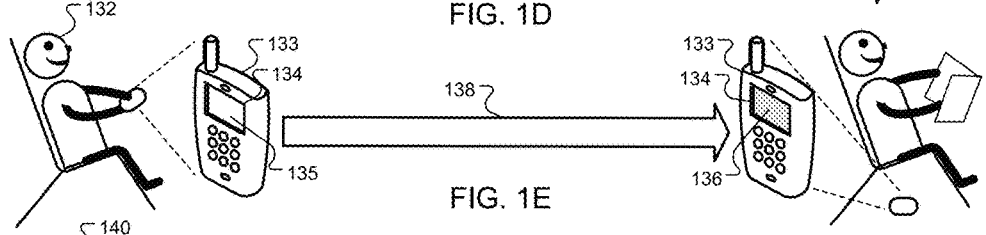

FIG. 1E shows a scenario in which a user 132 can be using a web browser on a mobile device 133. The user can use the web browser to enter the web page address of a web site that can include online games. For example, the user can select a game and play it on the mobile device 133. For example, the user 132 can activate a web browser application on the mobile device 133. As shown in FIG. 1E, the backlighting of the display 134 can be active, as shown on screen 135, while the user 132 is using the web browser or playing an online game. A period of time later, when the user is no longer actively playing the online game or browsing, the backlighting of the display 134 can be inactive, as shown on screen 136. The control of the backlighting (the amount of time 138 it is activated) can be based on the application being run by the mobile device (e.g., web browser). As shown in FIG. 1E, the backlight activation time 138 can be greater than the activation time 105 as the amount of time a user may need to use a web browser can be greater than the amount of time needed to initiate a phone call. The backlighting of the keypad may also be controlled at the same time or separately from the display backlighting. For example, the keypad backlight may be active when the user is entering an address, and then reduced when the page is loading or after is has loaded onto the display.

Figure 1F:
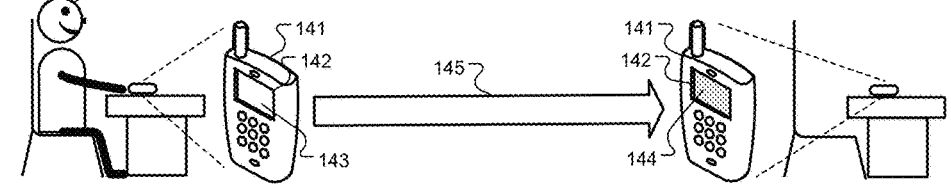

FIG. 1F shows a scenario in which a user 140 can be accessing, viewing, and sending email on a mobile device 141. For example, the user 140 can activate an email application on the mobile device 141. As shown in FIG. 1F, the backlighting of the display 142 can be active, as shown on screen 143, while the user 140 is initiating and using the email application (e.g., viewing, composing, and sending messages). A period of time later, when the user is no longer actively managing their email, the backlighting of the display 142 can be inactive, as shown on screen 144. The control of the backlighting (the amount of time 145 it is activated) can be based on the application being run by the mobile device (e.g., email application). As shown in FIG. 1F, the backlight activation time 145 can be greater than the activation time 105 as the amount of time a user may need to manage their email can be greater than the amount of time needed to initiate a phone call. The backlighting of the keypad may also be controlled at the same time or separately from the display backlighting. For example, the keypad backlight may be active when the user is typing, and then reduced when the message is sent, or when the user is reading the contents of an email.

As shown in FIGS. 1A-1F, the backlight activation time for a mobile device can vary dependent upon the application running on the mobile device. In some implementations, the activation time can be different for each mobile device function. In other implementations, the backlight activation time for a mobile device can be different for different groups of applications (e.g., applications that involve web access). Similarly, the keypad backlight activation time may vary based on the application running on the mobile device. Variously, the display and keypad backlights can be controlled together (such as when the device only has a single backlight), or separately.

In some implementations, the backlight activation time can be "learned" by the mobile device by monitoring the amount of time a user may spend running a particular application and using an average value for the backlight activation time. For example, a user may spend, on average, a certain period of time reading or writing a text message using a text application after opening a text message. The mobile device can learn this by monitoring the use of a text messaging application by a user during a fixed amount of time (e.g., two weeks), and using the average amount of time as the amount of time to keep the backlight activated. In other implementations, the user can manually program the amount of time for the device to remain with an active backlight depending on the application. In other implementations, times can have a default setting for each of various applications. For example, the backlight activation time may also be based in part on user data acquired from other users of the application on mobile devices. For example, a service provider can provide backlight expiration times for applications available on the mobile device based upon past data of mobile device usage gathered from a multitude of mobile devices.

As another example, phone numbers what require additional keypresses during a call may be learned by the system such that the keypad is maintained with the backlight on, or alternatively with a higher degree of backlighting than other numbers called.

As another example, the backlight activation timed can be modified based on individual user performance. As described earlier, the keypad may be monitored for a period of time after the backlighting has been reduced or turned off. If the user responds within this period (by a keypress, etc.) the device can learn that a longer backlight expiration time should be used for that application. The changed expiration time may be maintained for that application session only, or the expiration time for that application may be changed for all future uses of that application.

FIG. 2 shows a number of simplified display screens that can be viewed on a mobile device.

Figure 2A:
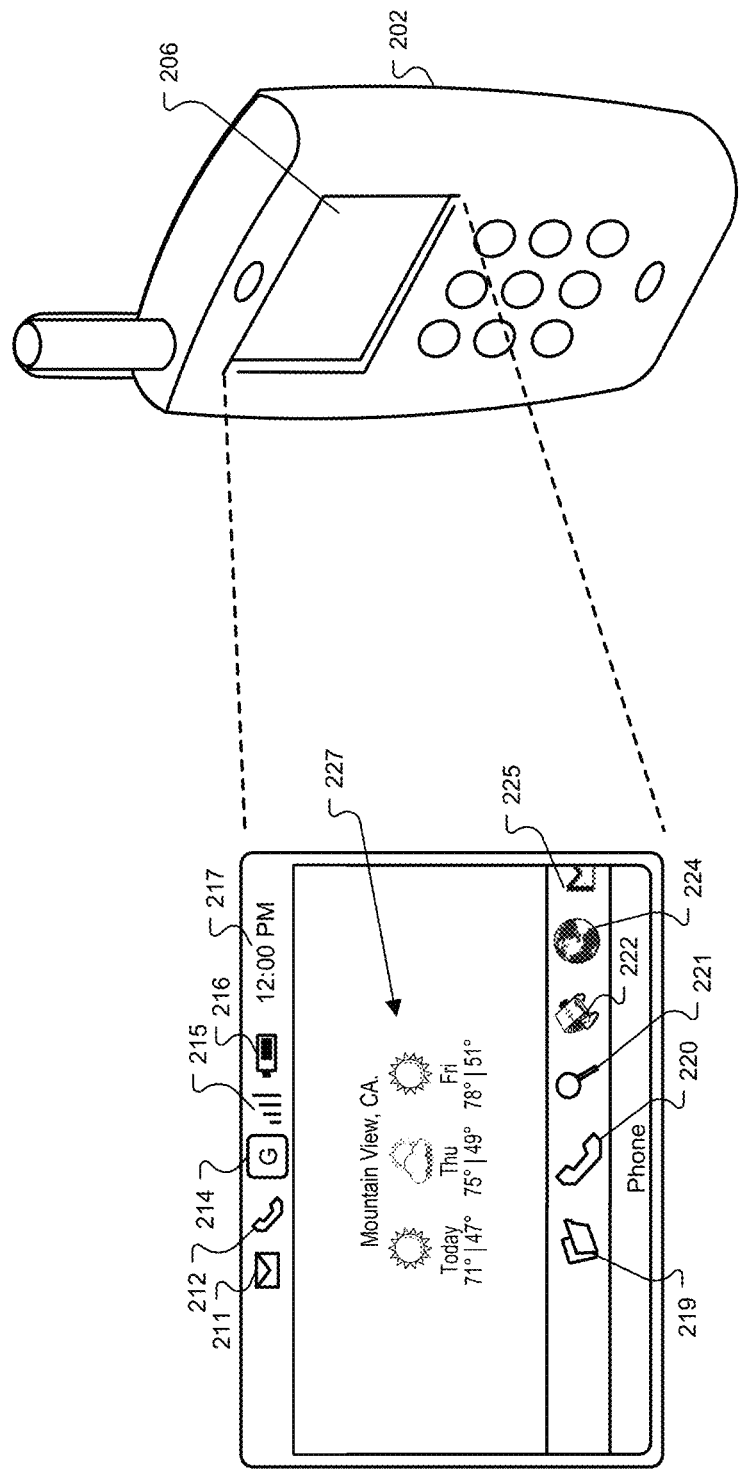
FIGS. 2A-2G show a number of simplified display screens that can be viewed on a mobile device.

FIG. 2A shows a simplified display screen 206 that can be viewed on a mobile device 202. Display screen 206 can include indicator elements. For example, the display screen 206 can include indicator elements such as a new mail indicator 211, an active call indicator 212, a data standard indicator 214, a signal strength indicator 215, a battery life indicator 216, and a clock 217, or other elements. Indicator elements will be described in further detail with reference to FIG. 4. The display screen 206 also can include application icons representing various applications available to the user. Examples of such icons may include a web browser application icon 219, a phone application icon 220, a search application icon 221, a contacts application icon 222, a mapping application icon 224, an email application icon 225, or other application icons. Display screen 206 can additionally include information the user may choose to display while the mobile device is in an inactive state (e.g., display information 227).

The backlighting of the display screen 206 can vary dependent upon user interaction with the mobile device. For example, a user may pick up the mobile device after it has not been used for a prolonged period of time. The display screen 206 may be dimmed (the backlighting is inactive), and the user may wish to brighten the display for improved visibility. In some implementations, the user can press a key on a keyboard or keypad to activate the backlighting on the display for easier viewing. In implementations where the mobile device is a flip phone, for example, the user may flip open the phone which can automatically activate the backlighting. In other implementations, the mobile device may include various detectors and sensors for detecting a change in the mobile device usage (e.g., the device is moved, the device is picked up by the user) and activating the backlighting responsive to this change. In another implementation, the mobile device may have just completed an activity and the user immediately initiates another one. In this case, the display screen 206 may not be dimmed between activities as the mobile device may not be inactive for a long enough period of time between applications.

The device may also include keypad backlighting that may be activated in a similar fashion to the activation of the display backlighting. The keypad backlighting may be reduced or turned off in a similar fashion to the backlighting reduction of the display as discussed in the specific examples below, or it may be controlled separately from the display backlighting. The keypad backlighting time may vary based on the application running on the device.

Figure 2B:
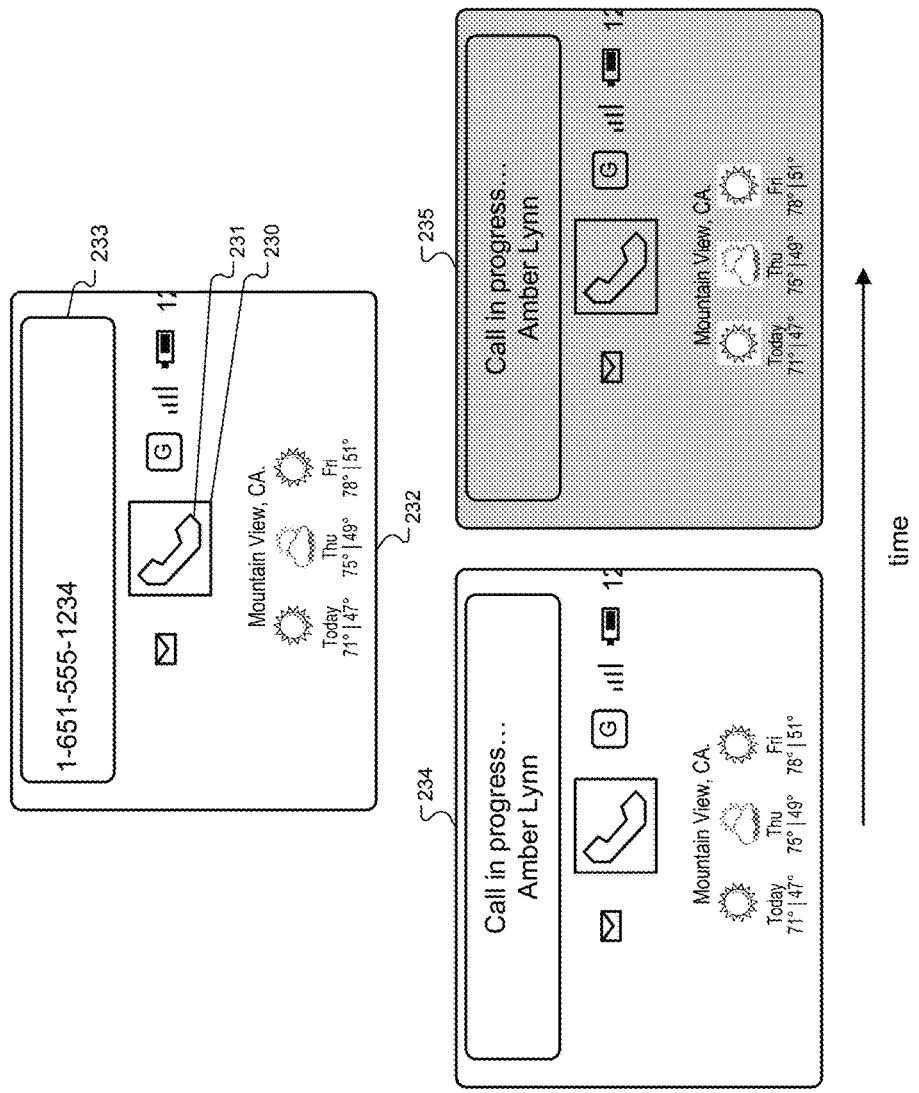

FIG. 2B shows simplified display screens 232, 234, 235 that can be viewed on mobile device 202 while it is running a phone application. Display screens 232, 234, 235 can be viewed on display screen 206 of the mobile device 202 at different points in time when the phone application is running.

With reference to FIG. 2A, the user can select phone application icon 220 to activate the phone application on the mobile device 202. The phone application icon 220 on the mobile device 202 can be selected using a pointing device and/or keyboard to point to and select the icon. Once the phone application is activated, the phone application icon can be highlighted to indicate it is active. Screen 232 can then be shown on display screen 206, including box 230 and enlarged phone application icon 231. The user can use a pointing device and/or keyboard to enter commands and data to operate and control the phone application. As is shown on screen 232, the user can be presented with an area 233 on the screen 232 where a phone number can be entered.

Upon selection and activation of the phone application, the mobile device 202 can determine how long to keep the backlighting of display screen 206 active. The time can be based on a typical user placing a phone call on a mobile device. Factors to consider can include, but are not limited to, the amount of time it takes for a user to enter the phone number, and the amount of time a user may view the display to see if the call is completed. The time may also be based on the typical time a user may desire to confirm the correct number was called after the last key was pressed, or on other considerations. The mobile device can keep the backlighting active for the determined amount of time, and then it can deactivate the backlighting. This may help conserve battery power, while decreasing errors and user frustration.

Screen 234 is an example of what may be shown on display screen 206 once a call is in progress. Screen 234 can be displayed for the duration of the call. In some implementations, screen 234 may be displayed for a period of time with backlighting activated, and after an expiration time passes, backlighting can be deactivated for the duration of the call (the display screen 206 is dimmed as shown by screen 235).

In some implementations, once the call has been terminated (the user and/or the called party terminate the call or are disconnected), the mobile device 202, aware of this event, can choose to reactivate the display backlighting. This can allow a user increased display legibility to select and activate another mobile device application. In some implementations, the reactivation of the backlighting on call termination can be a user selectable parameter in a mobile device configuration file. In other implementations, the mobile device may choose to always reactivate the backlighting upon call termination. In other implementations, the mobile device may choose not to reactivate the backlighting.

Figure 2C:
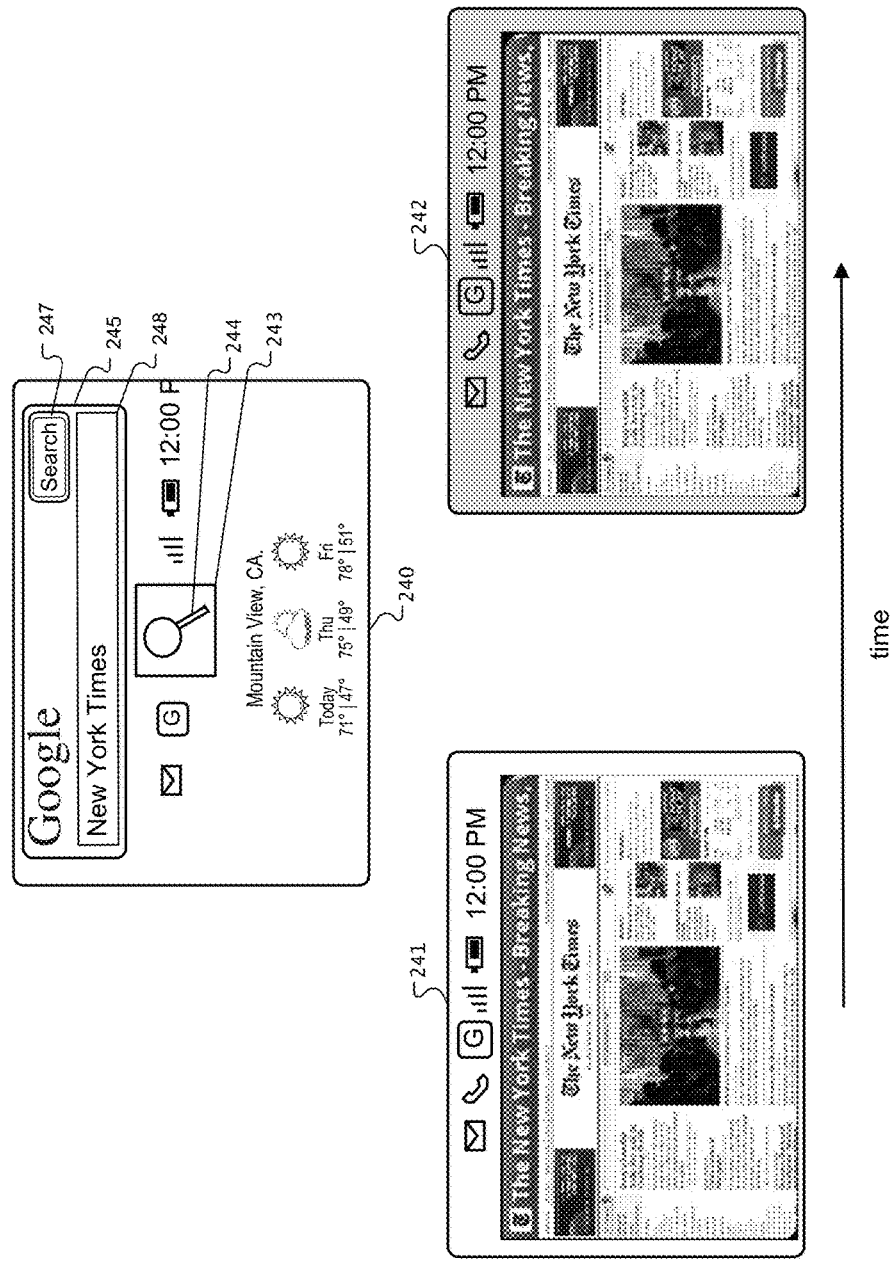

FIG. 2C shows simplified display screens 240, 241, 242 that can be viewed on the mobile device 202 while it is running a search application. Display screens 240, 241, 242 can be viewed on display screen 206 of the mobile device 202 at different points in time while the search application is running.

With reference to FIG. 2A, the user can select search application icon 221 to activate the search application on the mobile device 202. The search application icon 221 on the mobile device 202 can be selected and the search application activated in a similar manner as described in FIG. 2B. The search application icon 221 can then be highlighted (e.g., use of box 243 and enlarged phone application icon 244) indicating it is active, as shown in FIG. 2C.

Screen 240 can be shown on display screen 206 upon activation of the search application. The user can then use a pointing device and/or keyboard to enter commands and data to operate and control the search application. As is shown on screen 240, the user is presented with an area 245 on the screen 240 where they can enter a search query (e.g., "New York Times") in search box 248, and activate a corresponding search initiating control 247. Another screen (not shown) can be displayed to the user showing one or more results that are responsive to the search query. The user can select a desired result from a list of web page URLs (e.g., www.nytimes.com), and the corresponding web page can be displayed (e.g. screen 241). The user can then read and examine the web page.

Upon selection and activation of the search application, the mobile device 202 can determine how long to keep the backlighting of the display screen 206 active. In one approach, the determined time can be based on a typical user entering a search query, selecting a desired web page URL, and viewing the resulting web page. In another approach, the determined time can be measured from the last key press of the user, or from the time that the web page information is downloaded onto the device. Therefore, possible factors to consider can include, but are not limited to, the amount of time it takes for a user to enter a search string query, the amount of time to complete the search and display the results, the amount of time it takes the user to select a URL from the results list, the amount of time it takes to retrieve and display the corresponding web page, and the amount of time a user may take to review the web page. The mobile device can keep the backlighting active for the determined amount of time, and then reduce/deactivate the backlighting. The backlighting may be deactivated at a point in time when the user will no longer need to view the display (e.g., they have completed the review of the web page). This approach may help conserve battery power, while decreasing errors and user frustration.

Screen 241 is an example of a web page that can be shown on display screen 206 once a user has selected a result from a search query. Screen 241 can be displayed to the user for a period of time. Therefore, the backlighting for display screen 206 can be activated for a period of time to allow the user to read and review the screen 241, and then can be deactivated (the display screen 206 can be dimmed as shown by screen 242).

Figure 2D:
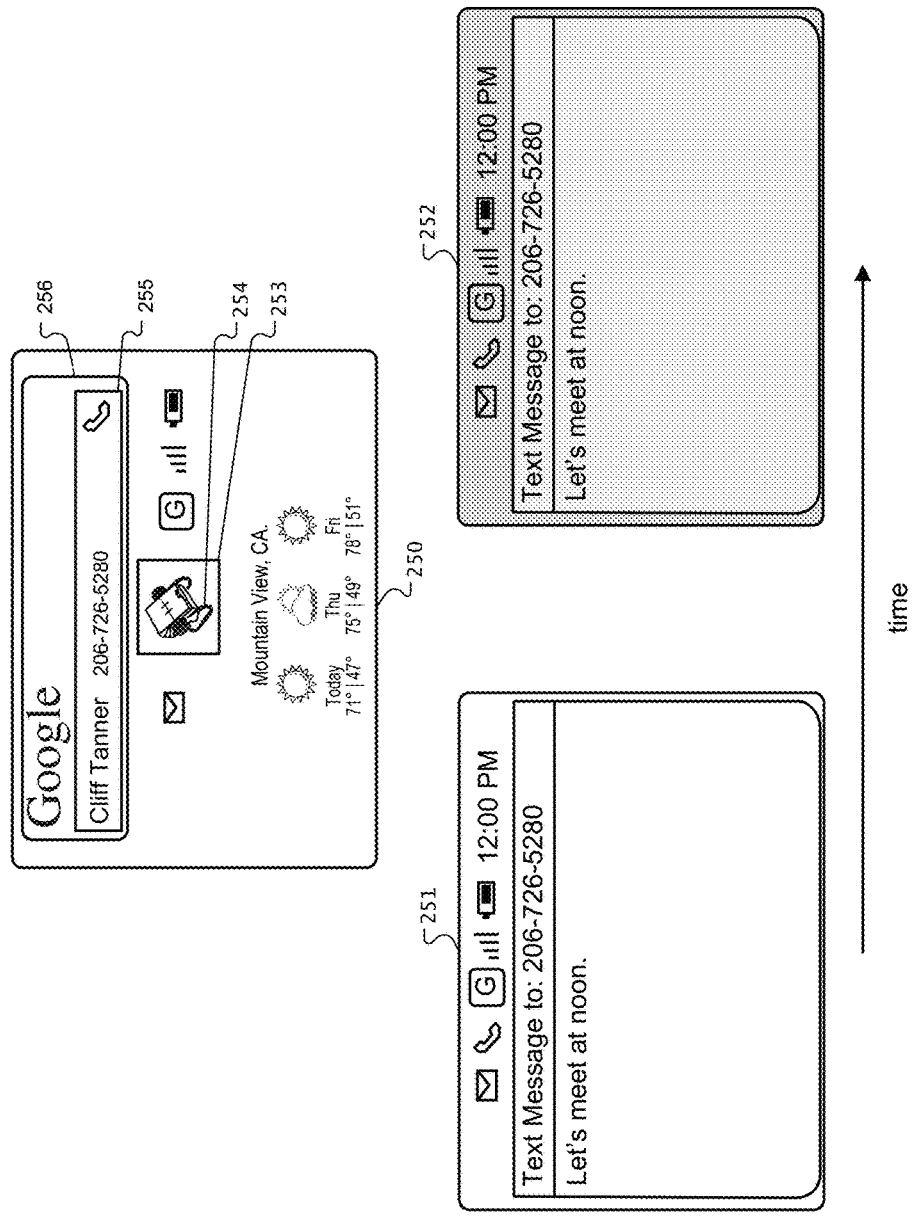

FIG. 2D shows simplified display screens 250, 251, 252 that can be viewed on the mobile device 202 while it is executing a text messaging application. Display screens 250, 251, 252 can be viewed on display screen 206 of the mobile device 202 at different points in time while the text messaging application is running.

With reference to FIG. 2A, the user can select contacts application icon 222 to activate the contacts application on the mobile device 202. The contacts application icon 222 on the mobile device 202 can be selected, and the contacts application activated in a similar manner as described in FIG. 2B. The contacts application icon 222 can then be highlighted (e.g., use of box 253 and enlarged contacts application icon 254) indicating it is active, as shown in FIG. 2D.

In some implementation, screens not shown in FIG. 2D, may be used to allow a user to search through their contacts list, and select an individual contact to send a text message to. Screen 250 shows a name and phone number of a selected contact in contact box 255 in an area 256 included on the screen 250. The user can then elect to send the contact a text message. For example, a user may activate a drop down menu via a drop down menu key included on a keyboard of the mobile device. The drop down menu can include a selection to send a text message to the contact. Selecting the text message option can result in screen 251 being shown on display screen 206.

The user can enter a text message (e.g., message 257) using the mobile device keyboard, for example. Upon completion of text entry, the user can elect to send the text message. For example, the user may again activate a drop down menu and select a send message option. In another example, the user may activate the drop down menu and elect to store the message as a draft, or delete the message.

Upon selection and activation of the contacts application, the mobile device 202 can determine how long to keep the backlighting of the display screen 206 active. The amount of time the backlighting for display screen 206 can be activated for a text messaging application can be based on the time it takes a typical user to enter a standard length text message. The mobile device can keep the backlighting active for this amount of time, and then it can deactivate the backlighting. The backlighting may be deactivated at a point in time when the user will no longer need to view the display (e.g., they have entered and sent the text message).

Figure 2E:
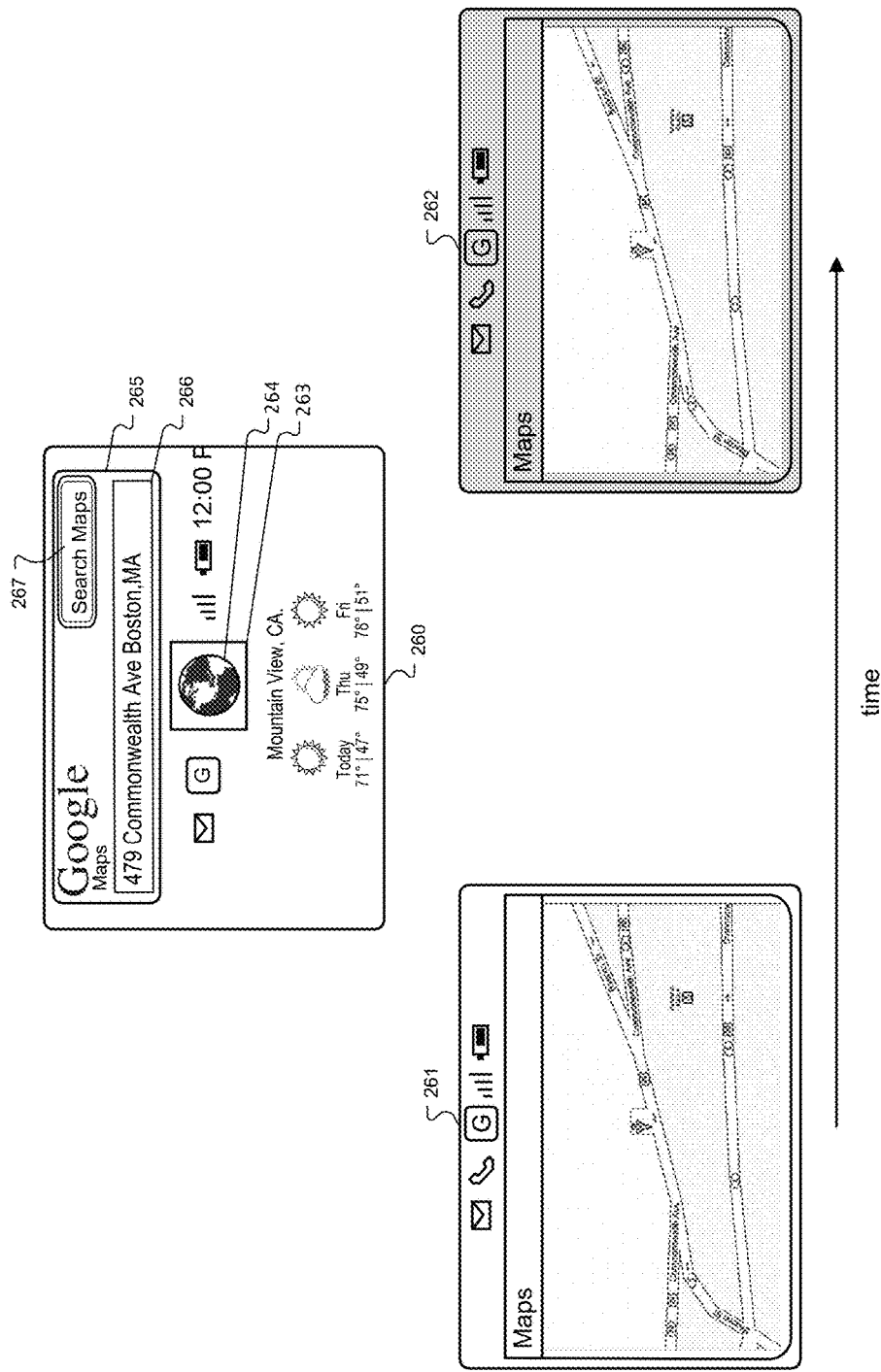

FIG. 2E shows simplified display screens 260, 261, 262 that can be viewed on the mobile device 202 while it is running a mapping application. Display screens 260, 261, 262 can be viewed on display screen 206 of the mobile device 202 at different points in time while the mapping application is running.

With reference to FIG. 2A, the user can select mapping application icon 224 to activate the mapping application on the mobile device 202. The mapping application icon 224 on the mobile device 202 can be selected and the mapping application activated in a similar manner as described in FIG. 2B. The mapping application icon can then be highlighted (e.g., use of box 263 and enlarged mapping application icon 264) indicating it is active, as shown in FIG. 2E.

Screen 260 can be shown on display screen 206 upon activation of the mapping application. The user can use the pointing device and/or keyboard to enter commands and data to operate and control the mapping application. As shown on screen 260, the user can be presented with an area 265 on the screen 260 where they can enter an address (e.g., "479 Commonwealth Ave Boston, Mass.") in search box 266, and activate a corresponding search initiating control 267. Screen 261 is an example of a map that can be shown as a result of the search. In some implementations, intermediate screens may be shown on display screen 206 that can include multiple similar address location results for a user to select from prior to receiving the resulting map.

Upon selection and activation of the mapping application, the mobile device 202 can determine how long to keep the display backlighting active. This time can be based on a typical user entering an address, and viewing the resulting map. Factors to consider can include, but are not limited to, the amount of time it takes a user to enter an address, the amount of time to complete the search and display the map, and the amount of time a user may take to review the map. The mobile device can keep display backlighting active for this amount of time, and then, in order to conserve battery power, it can reduce/deactivate the backlighting. The backlighting may be deactivated at a point in time when the user no longer needs to view the display (e.g., they have completed the review of the map).

Screen 261 can be displayed to the user for a period of time. Therefore, the backlighting for display screen 206 can be activated for a period of time to allow the user to read and review the screen 261, and then can be deactivated, displaying screen 262.

Figure 2F:
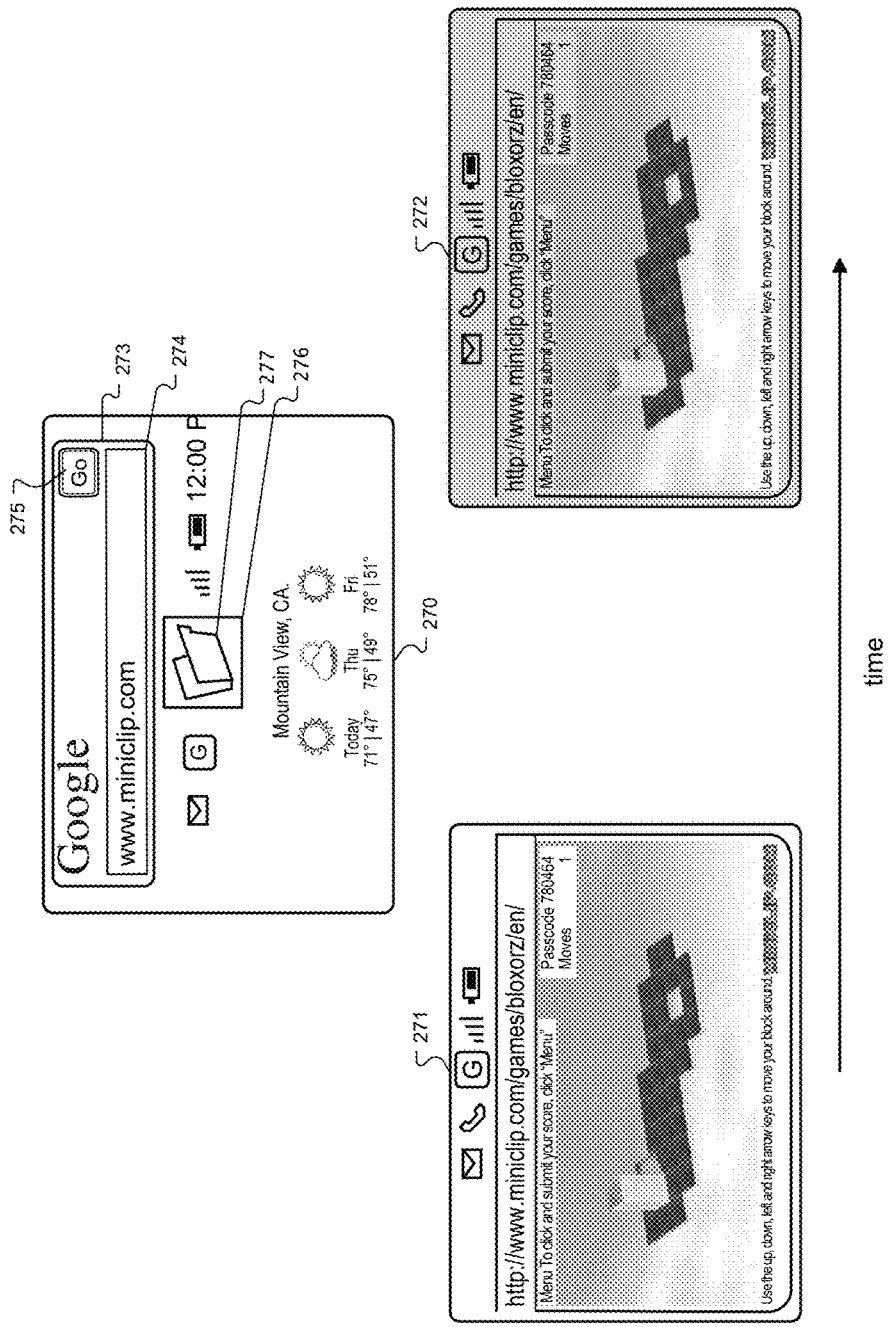

FIG. 2F shows simplified display screens 270, 271, 272 that can be viewed on the mobile device 202 while it is running a web browser application. Display screens 270, 271, 272 can be viewed on display screen 206 of the mobile device 202 at different points in time while the web browser application is running.

With reference to FIG. 2A, the user can select web browser application icon 219 to activate the web browser application on the mobile device 202. The web browser application icon 219 on the mobile device 202 can be selected and the web browser application can be activated in a similar manner as described in FIG. 2B. The web browser application icon can then be highlighted (e.g., use of box 276 and enlarged web browser application icon 277) indicating it is active, as shown in FIG. 2F.

Screen 270 can be shown on display screen 206 upon activation of the web browser application. The user can then use a pointing device and/or keyboard to enter commands and data to operate and control the web browser application. As shown on screen 270, the user can be presented with an area 273 on the screen 270 where they can enter a URL (e.g., "www.miniclip.com") in address box 274, and activate a corresponding initiating control 275, that upon activation will display the web page on a screen (not shown). The user can navigate the web page and select a link on the web page that can result in the displaying of another web page as shown in screen 271 (e.g., selecting of the link to the bloxorz puzzle on the miniclip web page). The user can then play the puzzle game.

Upon selection and activation of the web browser application, the mobile device 202 can determine how long to keep the backlighting of the display screen 206 active. The time can be based on a typical user entering a URL, and viewing the resulting web page. Factors to consider can include, but are not limited to, the amount of time it takes for a user to enter a URL, the amount of time it takes to retrieve and display the corresponding web page, and the amount of time a user may take to review the web page.

In the implementation of FIG. 2F, backlighting for the display screen 206 can remain active. The mobile device can keep the backlighting active for this amount of time, and then the backlighting can be deactivated. The backlighting may be deactivated at a point in time when the user will no longer need to view the display (e.g., they are done playing their game).

Screen 271 is an example of a screen that can be shown on display screen 206 while a user is playing an online game. Other screens can be displayed as the user progresses through the game. The backlighting for display screen 206 can be activated for a period of time to allow the user to play the game for a reasonable amount of time, and then can be deactivated (the display screen 206 can be dimmed as shown by screen 272) to conserve battery power.

Figure 2G:
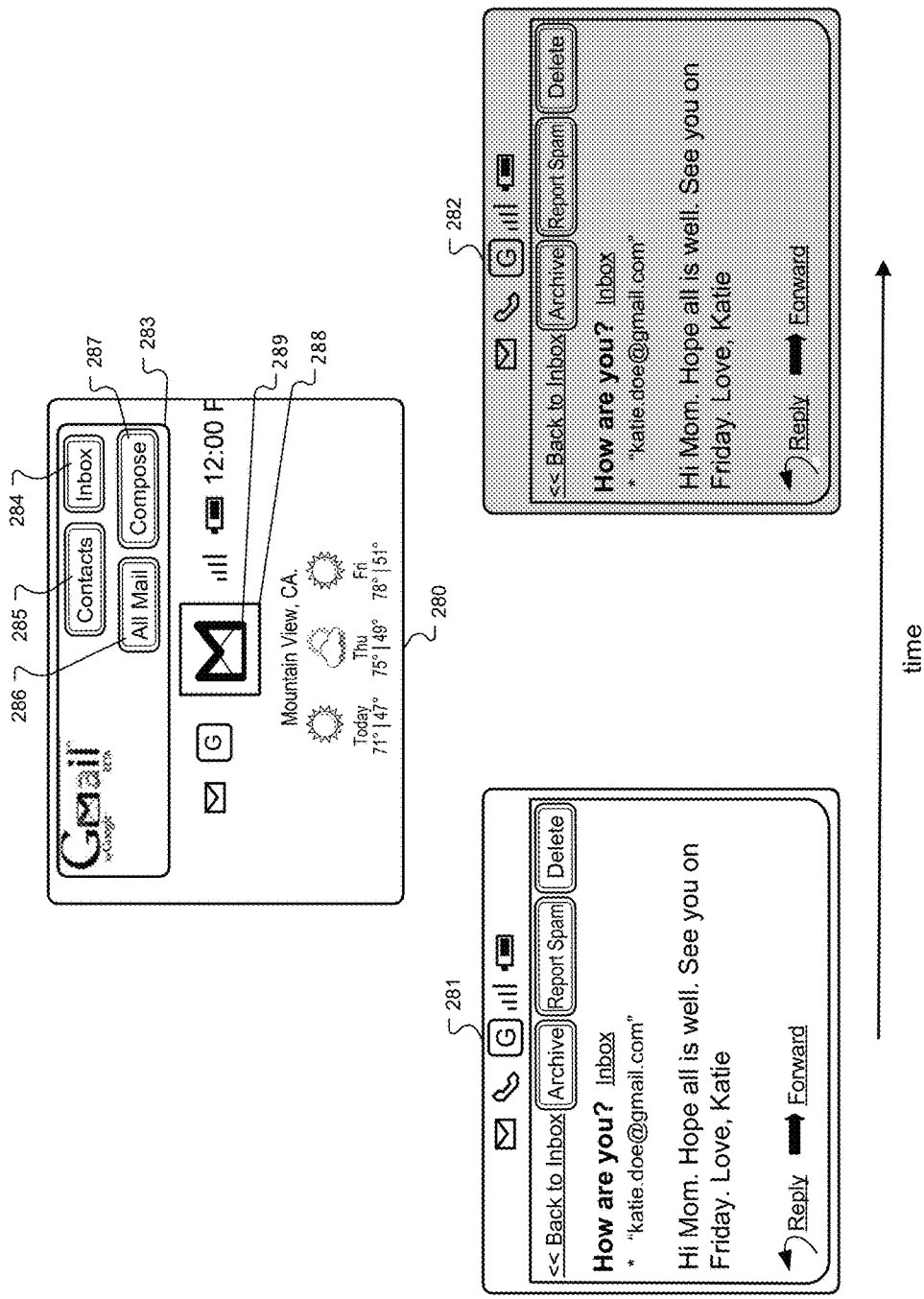

FIG. 2G shows simplified display screens 280, 281, 282 that can be viewed on the mobile device 202 while it is running an email application. Display screens 280, 281, 282 can be viewed on display screen 206 of the mobile device 202 at different points in time while the email application is running.

With reference to FIG. 2A, the user can select email application icon 225 to activate the email application on the mobile device 202. The email application icon 225 on the mobile device 202 can be selected and the email application activated in a similar manner as described in FIG. 2B. The email application icon can then be highlighted (e.g., use of box 288 and enlarged email application icon 299) indicating it is active, as shown in FIG. 2G.

Screen 280 can be shown on display screen 206 upon activation of the email application. The user can use a pointing device and/or keyboard to enter commands and data to operate and control the email application. As shown on screen 280, the user can be presented with an area 283, where they can activate inbox control 284, contacts control 285, all mail control 286, or compose control 287. In some implementations, the user may be presented with additional controls for the email application. For example, in the implementation of FIG. 2G the user can activate the inbox control 284, resulting in screen 281 that can be displayed on display screen 206 of the mobile device 202.

Upon selection and activation of the email application, the mobile device 202 can determine how long to keep the backlighting of the display screen 206 active. The amount of time can be based on how a typical user utilizes their email application. Possible email application uses can include, but are not limited to, reading email, composing email, and managing email contacts. The mobile device can keep backlighting active for an amount of time that can be considered typical for the use of the email application, and then, in order to conserve battery power, it can deactivate the backlighting. The backlighting may be deactivated at a point in time when the user will no longer need to view the display (e.g., they are done checking their email).

Screen 281 is an example of an email message that can be shown on display screen 206 if the user has activated the inbox control 284. The backlighting for display screen 206 can be activated for a period of time to allow the user to read and review the screen 281, and then can be deactivated (the display screen 206 can be dimmed as shown by screen 282) to conserve battery power.

Figure 3:
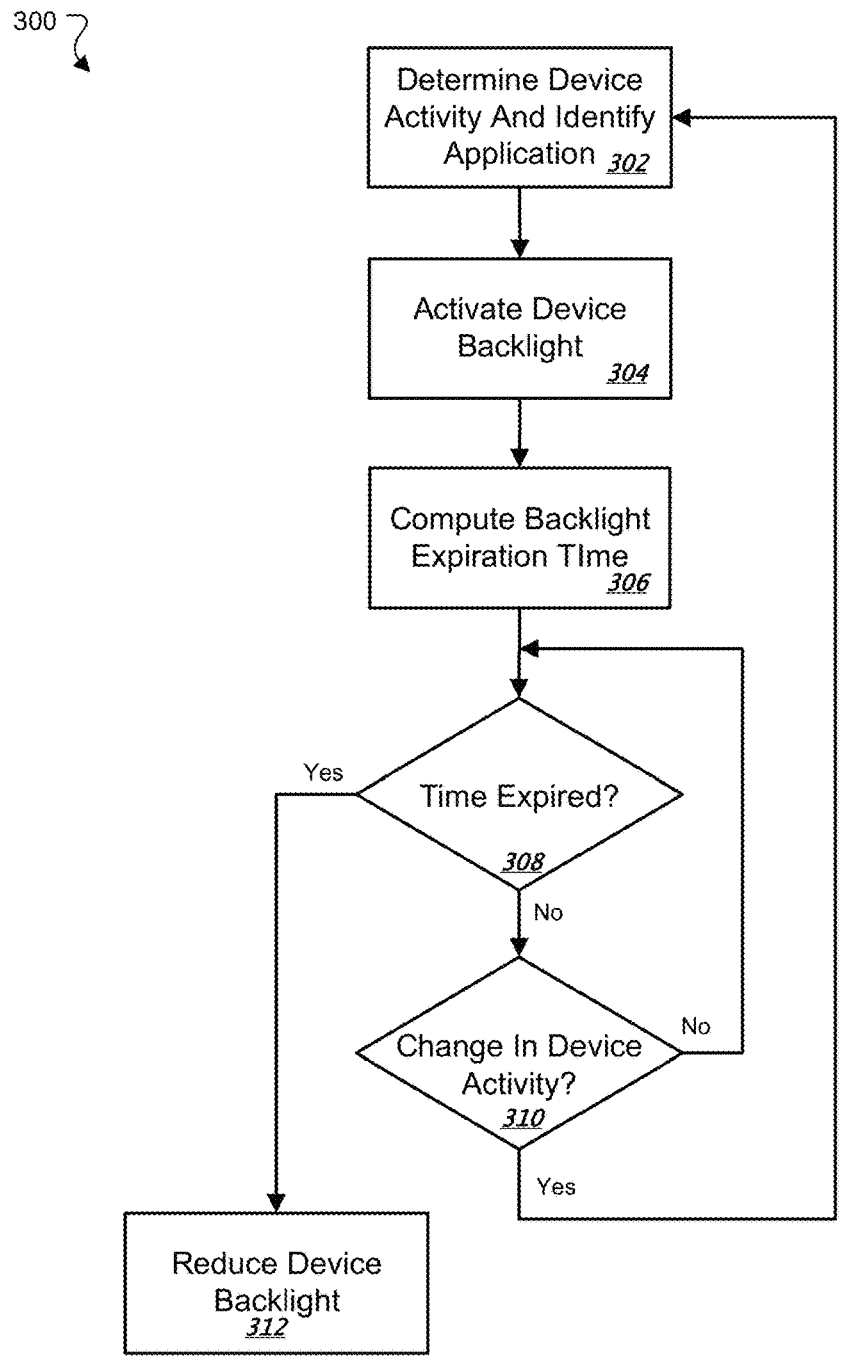
FIG. 3 is a flow diagram illustrating one example of a flow process to determine the control of the backlighting of a display on a mobile device.

FIG. 3 is a flow diagram illustrating one example of a process 300 for context-sensitive control of the backlighting of a display on a mobile device. The process 300 begins by determining the mobile device activity and identifying the application being used on the mobile device 302. As was described with reference to FIGS. 2A-2G, when the user activates an application by selecting an application icon, the mobile device runs the selected application. The device can now be considered active, and the device backlight is activated 304 to allow the user improved visibility of the information presented on the screen of the mobile device as the user interacts with the mobile device, or interacts with an application running on the mobile device.

A backlight expiration time is then computed 306, using the application identified application running on the mobile device as a factor. Thus, the amount of time that the backlight stays fully activated is determined at least in part based on the identity of the application running on the mobile device. For example, referring to FIGS. 2A-2G, a calculated backlight expiration time may be longer for an email application than a calculated backlight expiration time for a phone application.

In some implementations, the computed backlight expiration time can be based on additional factors as well as on the active application running on the device. For example, the computed backlight expiration time may also be based in part on user data acquired from other users of the application on mobile devices. For example, a service provider can provide backlight expiration times for applications available on the mobile device based upon past data of mobile device usage gathered from a multitude of mobile devices. As another example, the computed backlight expiration time may also be based on preferences identified by the user, such as information entered regarding specific applications (e.g., longer backlight expiration time preference for a text entry application), or a general preference (e.g., shorter backlight expiration times to conserve battery power). The expiration time may also be based on a position of the device (e.g., vertical versus horizontal, with horizontal having a shorter expiration time under the assumption that the user has put the device down on a surface) as determined, for example, by an accelerometer, switch, and/or other mechanism in the device. Also, movement of the device, such as determined by an accelerometer in the device may indicate that the device is more likely to be in use, and thus will result in a lengthening of the expiration time. Also, movement of the device geographically, rather than in terms of shaking, may be relevant, as measured by a GPS feature, to indicate that the device is in motion and perhaps less likely to be in use (e.g., because the user is busy walking or driving). In addition, a light sensor, such as one provided with a telephone camera may be used to determine the ultimate need for backlighting so that a backlight can run longer at night than it does in the day. Similarly, a clock on a device may be used to infer that the device is in the dark (and thus lengthen the expiration time) or the daytime light (and thus shorten expiration time).

In some implementations, the backlight expiration time can be stored in a database on the mobile device and accessed when the application is activated. In other implementations, the backlight expiration time can be stored in a database at a service provider, and provided to the mobile device when a connection is made between the service provider and mobile device. This can allow for frequent updates of backlight expiration times which can be beneficial when applications are updated and/or added to the mobile device.

The process 300 checks if the backlight expiration time has expired at step 308. If the backlight expiration time has expired, the device backlight is reduced at step 312. In some implementations, reducing the backlight may include turning off the backlight completely. In other implementations, reducing the backlight may include reducing the backlight output by 33%, 50%, 75%, or some other percentage.

Until the backlight expiration time has expired, the process 300 checks whether there has been a change in mobile device activity 310. If no change in activity has occurred, the process 300 returns to checking if the backlight expiration time has expired 308. If there has been a change in device activity before the backlight expiration time has expired, the process 300 continues by determining the mobile device activity and identifying the application running on the mobile device 302. A change in activity includes activity within the active application, such as dialing another phone number, sending or receiving a text message, entering a new webpage address, scrolling on a currently displayed webpage address, etc., and also includes activation of a different application.

Figure 4:
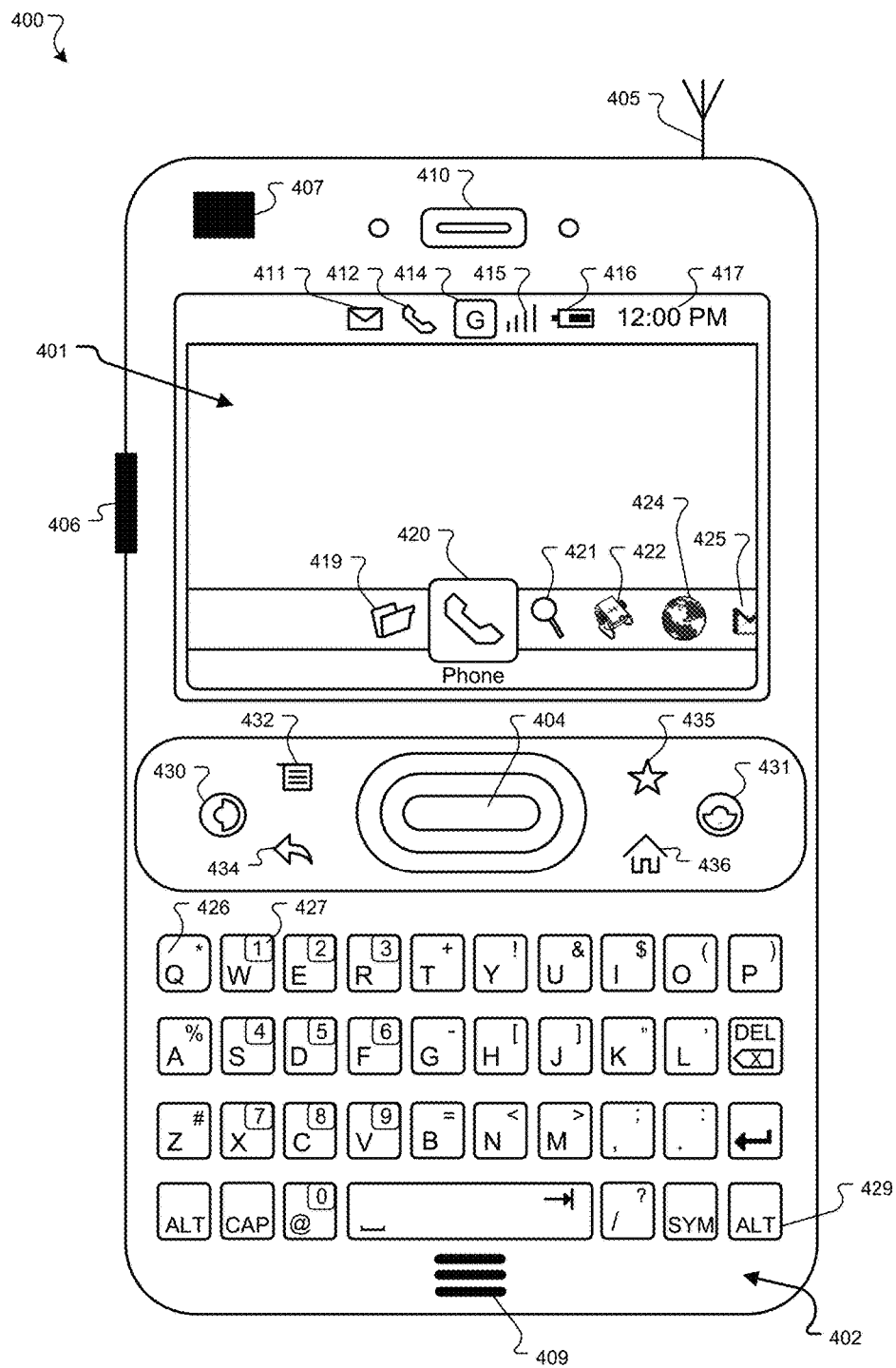
FIG. 4 is a schematic representation of an exemplary mobile device that implements embodiments of the backlighting control described herein.

Referring now to FIG. 4, the exterior appearance of an exemplary device 400 that implements the context sensitive backlight control is illustrated. Briefly, and among other things, the device 400 includes a processor configured to determine the activity on the mobile device, identify a running application, activate the display backlight, compute a backlight expiration time, and wait until the time has expired to deactivate the display backlighting.

In more detail, the hardware environment of the device 400 includes a display 401 for displaying text, images, and video to a user; a keyboard 402 for entering text data and user commands into the device 400; a pointing device 404 for pointing, selecting, and adjusting objects displayed on the display 401; an antenna 405; a network connection 406; a camera 407; a microphone 409; and a speaker 410. Although the device 400 includes an external antenna, it is anticipated that the device 400 can instead or additionally include an internal antenna, which is not visible to the user. The display 401 may include a backlight feature. The keyboard 402 may include a backlight feature—for example, the keypad area may light up, the keys may be lighted, or the surface of the keys may be lighted in some fashion (such as light outlining the number or letter on top of a key).

The display 401 displays video, graphics, images, and text that make up the user interface for the software applications used by the device 400, and the operating system programs used to operate the device 400. Among the possible elements that may be displayed on the display 401 are a new mail indicator 411 that alerts a user to the presence of a new message; an active call indicator 412 that indicates that a telephone call is being received, placed, or is occurring; a data standard indicator 414 that indicates the data standard currently being used by the device 400 to transmit and receive data; a signal strength indicator 415, such as signal strength bars, that indicates a measurement of the strength of a signal received by the device 400 via the antenna 405; a battery life indicator 416 that indicates a measurement of the remaining battery life; or a clock 417 that outputs the current time.

The display 401 may also show application icons representing various applications available to the user, such as a web browser application icon 419, a phone application icon 420, a search application icon 421, a contacts application icon 422, a mapping application icon 424, an email application icon 425, or other application icons. In one example implementation, the display 401 is a quarter video graphics array (QVGA) thin film transistor (TFT) liquid crystal display (LCD), capable of 16-bit or better color.

A user uses the keyboard (or "keypad") 402 to enter commands and data to operate and control the operating system and applications that provide for backlight control of a display. The keyboard 402 includes standard keyboard buttons or keys associated with alphanumeric characters, such as keys 426 and 427 that are associated with the alphanumeric characters "Q" and "W" when selected alone, or are associated with the characters "*" and "1" when pressed in combination with key 429. A single key may also be associated with special characters or functions, including unlabeled functions, based upon the state of the operating system or applications invoked by the operating system. For example, when an application calls for the input of a numeric character, a selection of the key 427 alone may cause a "1" to be input.

In addition to keys traditionally associated with an alphanumeric keypad, the keyboard 402 also includes other special function keys, such as an establish call key 430 that causes a received call to be answered or a new call to be originated; a terminate call key 431 that causes the termination of an active call; a drop down menu key 432 that causes a menu to appear within the display 401; a backwards navigation key 434 that causes a previously accessed network address to be accessed again; a favorites key 435 that causes an active web page to be placed in a bookmarks folder of favorite sites, or causes a bookmarks folder to appear; a home page key 436 that causes an application invoked on the device 400 to navigate to a predetermined network address; or other keys that provide for multiple-way navigation, application selection, and power and volume control.

The user uses the pointing device 404 to select and adjust graphics and text objects displayed on the display 401 as part of the interaction with and control of the device 400 and the applications invoked on the device 400. The pointing device 404 is any appropriate type of pointing device, and may be a joystick, a trackball, a touch-pad, a camera, a voice input device, a touch screen device implemented in combination with the display 401, or any other input device.

The antenna 405, which can be an external antenna or an internal antenna, is a directional or omni-directional antenna used for the transmission and reception of radiofrequency (RF) signals that implement point-to-point radio communication, wireless local area network (LAN) communication, or location determination. The antenna 405 may facilitate point-to-point radio communication using the Specialized Mobile Radio (SMR), cellular, or Personal Communication Service (PCS) frequency bands, and may implement the transmission of data using any number or data standards. For example, the antenna 405 may allow data to be transmitted between the device 400 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access 3000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with a QUALCOMM® RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a WiFi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, an IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 407 allows the device 400 to capture digital images, and may be a scanner, a digital still camera, a digital video camera, or other digital input device. In one example implementation, the camera 407 is a 3 mega-pixel (MP) camera that utilizes a complementary metal-oxide semiconductor (CMOS).

The microphone 409 allows the device 400 to capture sound, and may be an omni-directional microphone, a unidirectional microphone, a bi-directional microphone, a shotgun microphone, or other type apparatus that converts sound to an electrical signal. The microphone 409 may be used to capture sound generated by a user, for example when the user is speaking to another user during a telephone call via the device 400. Conversely, the speaker 410 allows the device to convert an electrical signal into sound, such as a voice from another user generated by a telephone application program, or a ring tone generated from a ring tone application program. Furthermore, although the device 400 is illustrated in FIG. 4 as a handheld device, in further implementations the device 400 may be a laptop, a workstation, a midrange computer, a mainframe, an embedded system, telephone, desktop PC, a tablet computer, a PDA, or other type of computing device.

Figure 5:
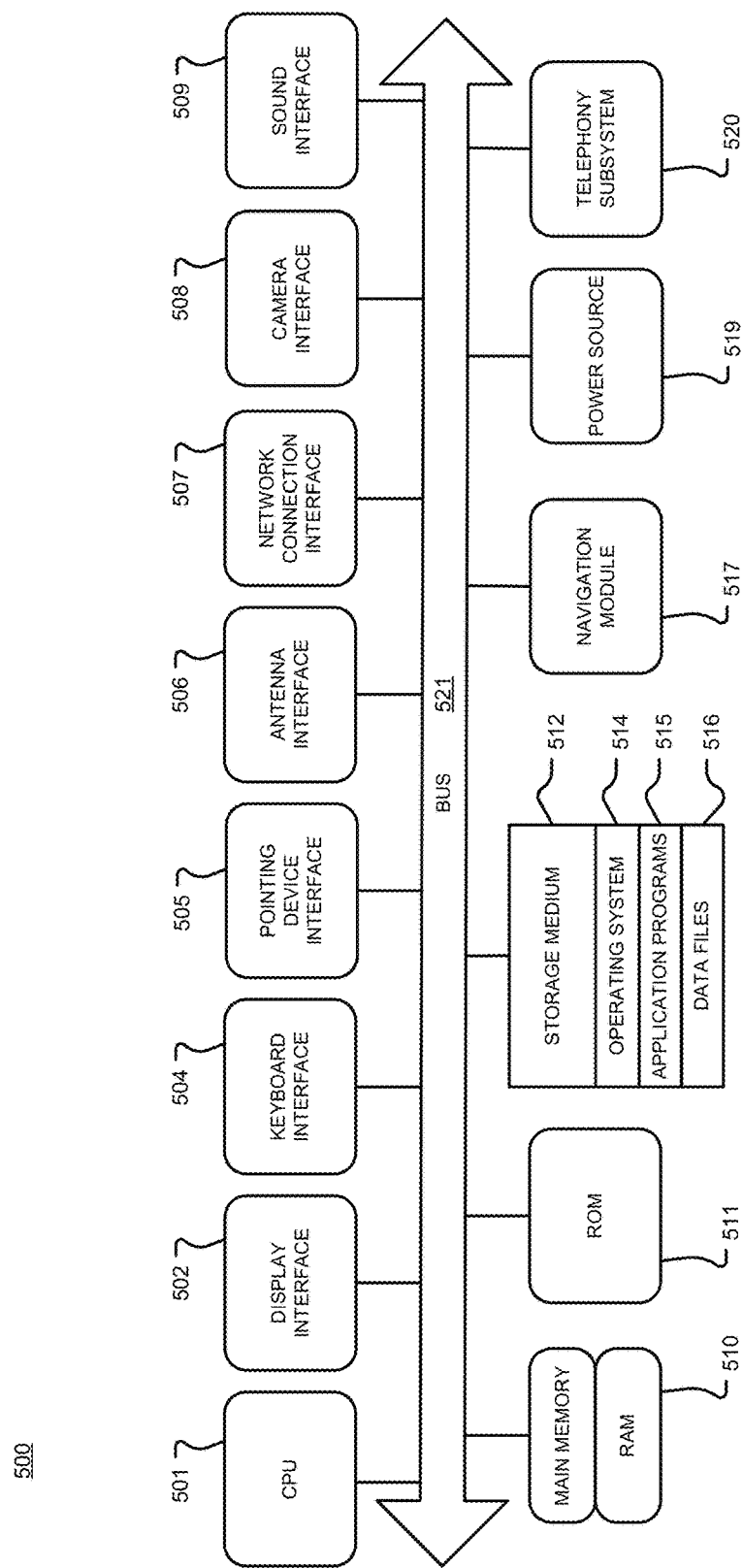
FIG. 5 is a block diagram illustrating the internal architecture of the device of FIG. 4.

FIG. 5 is a block diagram illustrating an internal architecture 500 of the device 400. The architecture includes a central processing unit (CPU) 501 where the computer instructions that comprise an operating system or an application are processed; a display interface 502 that provides a communication interface and processing functions for rendering video, graphics, images, and texts on the display 401, provides a set of built-in controls (such as buttons, text and lists), and supports diverse screen sizes; a keyboard interface 504 that provides a communication interface to the keyboard 402; a pointing device interface 505 that provides a communication interface to the pointing device 404; an antenna interface 506 that provides a communication interface to the antenna 405; a network connection interface 507 that provides a communication interface to a network over the computer network connection 406; a camera interface 508 that provides a communication interface and processing functions for capturing digital images from the camera 407; a sound interface 509 that provides a communication interface for converting sound into electrical signals using the microphone 409 and for converting electrical signals into sound using the speaker 410; a random access memory (RAM) 510 where computer instructions and data are stored in a volatile memory device for processing by the CPU 501; a read-only memory (ROM) 511 where invariant low-level systems code or data for basic system functions such as basic input and output (I/O), startup, or reception of keystrokes from the keyboard 402 are stored in a non-volatile memory device; a storage medium 512 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 514, application programs 515 (including, for example, a web browser application, a widget or gadget engine, and or other applications, as necessary) and data files 516 are stored; a navigation module 517 that provides a real-world or relative position or geographic location of the device 400; a power source 519 that provides an appropriate alternating current (AC) or direct current (DC) to power components; and a telephony subsystem 520 that allows the device 400 to transmit and receive sound over a telephone network. The constituent devices and the CPU 501 communicate with each other over a bus 521.

The CPU 501 is one of a number of computer processors, including microprocessors, microcontrollers, and other types of integrated circuit controller chips. In one arrangement, the computer CPU 501 is more than one processing unit. The RAM 510 interfaces with the computer bus 521 so as to provide quick RAM storage to the CPU 501 during the execution of software programs such as the operating system application programs, and device drivers. More specifically, the CPU 501 loads computer-executable process steps from the storage medium 512 or other media into a field of the RAM 510 in order to execute software programs. Data is stored in the RAM 510, where the data is accessed by the computer CPU 501 during execution. In one example configuration, the device 400 includes at least 128 MB of RAM, and 256 MB of flash memory.

The storage medium 512 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like, stored on removable and non-removable memory media, to off-load data from the device 400, or to upload data onto the device 400.

A computer program product is tangibly embodied in storage medium 512, a machine-readable storage medium. The computer program product includes instructions that, when read by a machine, operate to cause a data processing module to store application dependent backlight activation expiration times in the mobile device. In some embodiments, the computer program product includes instructions that determine the activity on the mobile device, identify a running application, activate the display backlight, compute a backlight expiration time, check application status, and wait until the time has expired to deactivate the display backlighting.

The operating system 514 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 514, and the application programs 515 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 415 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for backlight control using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 517 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 517 may also be used to measure angular displacement, orientation, or velocity of the device 400, such as by using one or more accelerometers.

Figure 6:
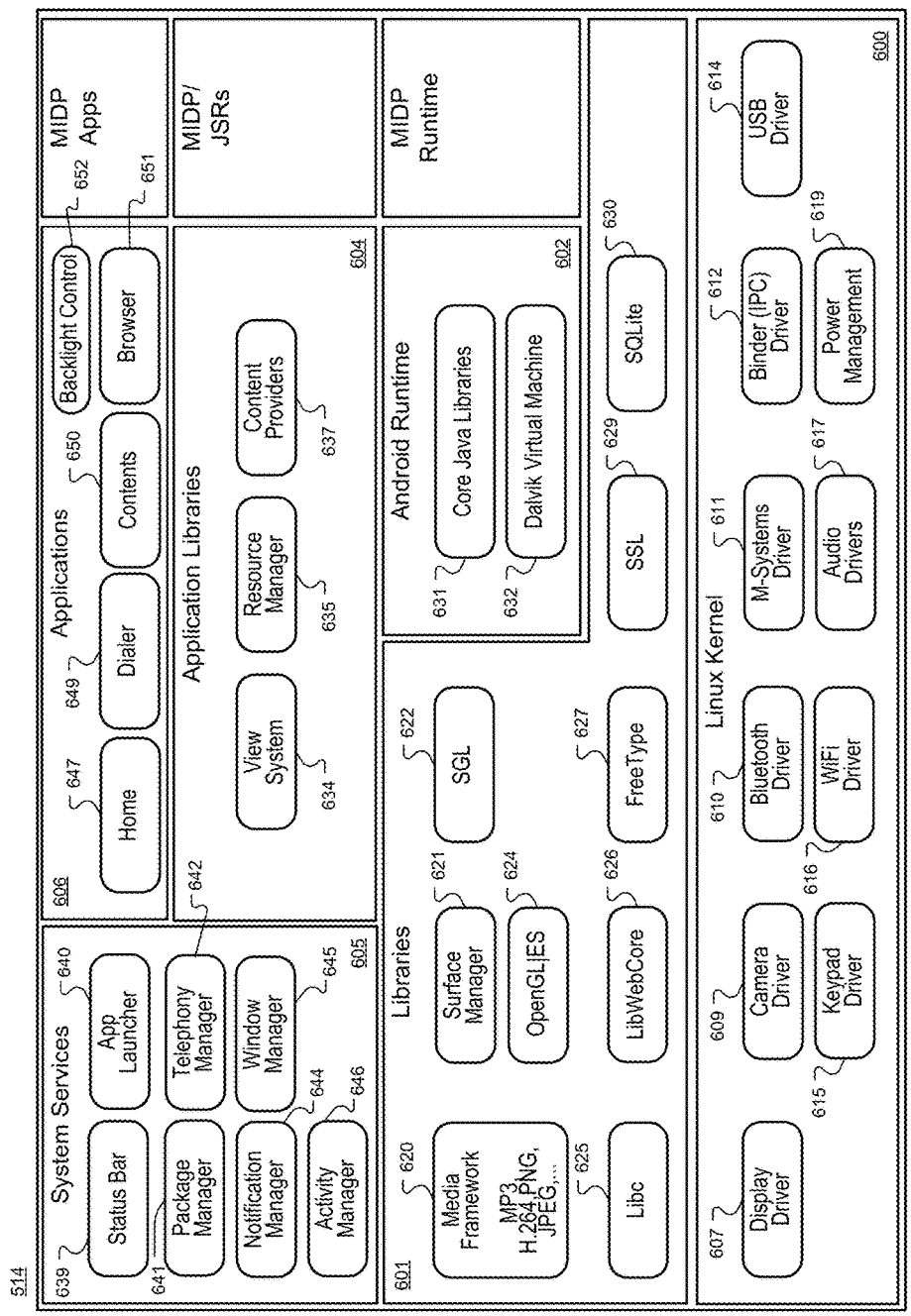
FIG. 6 is a block diagram illustrating exemplary components of the operating system used by the device of FIG. 4.

FIG. 6 is a block diagram illustrating exemplary components of the operating system 514 used by the device 400, in the case where the operating system 414 is the GOOGLE mobile device platform The operating system 514 invokes multiple processes, while ensuring that the associated phone application is responsive, and that wayward applications do not cause a fault (or "crash") of the operating system. Using task switching, the operating system 514 allows for the switching of applications while on a telephone call, without losing the state of each associated application. The operating system 514 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 514 can generally be organized into six components: a kernel 600, libraries 601, an operating system runtime 602, application libraries 604, system services 605, and applications 606. The kernel 600 includes a display driver 607 that allows software such as the operating system 514 and the application programs 515 to interact with the display 401 via the display interface 502; a camera driver 609 that allows the software to interact with the camera 407 via the camera interface 508; a BLUETOOTH® driver 610; a M-Systems driver 611; a binder (IPC) driver 612; a USB driver 614; a keypad driver 615 that allows the software to interact with the keyboard 402 via the keyboard interface 504; a WiFi driver 616; audio drivers 617 that allow the software to interact with the microphone 409 and the speaker 410 via the sound interface 509; and a power management component 619 that allows the software to interact with and manage the power source 519.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 601 include a media framework 620 that supports standard video, audio and still-frame formats (such as Moving Picture Experts Group (MPEG)-4, H.264, MPEG-1 Audio Layer 5 (MP3), Advanced Audio Coding (AAC), Adaptive Multi-Rate (AMR), Joing Photographic Experts Group (JPEG), and others) using an efficient JAVA® Application Programming Interface (API) layer; a surface manager 621; a simple graphics library (SGL) 622 for two-dimensional application drawing; an Open Graphics Library for Embedded Systems (OpenGL ES) 624 for gaming and three-dimensional rendering; a C standard library (Libc) 625; a LibWebCorelibrary 626; a FreeType library 627; an SSL 629; and an SQLite library 630.

The operating system runtime 602, which generally makes up a Mobile Information Device Profile (MIDP) runtime, includes core JAVA libraries 631, and a Dalvik virtual machine 632. The Dalvik virtual machine 632 is a custom, virtual machine that runs a customized file format (.DEX).

The operating system 514 can also include Mobile Information Device Profile (MIDP) components such as the MIDP JAVA Specification Requests (JSRs) components, MIDP runtime, and MIDP applications as shown in FIG. 6. The MIDP components can support MIDP applications running on the device 400.

With regard to graphics rendering, a system-wide composer manages surfaces and a frame buffer and handles window transitions, using the OpenGL ES 624 and two-dimensional hardware accelerators for its compositions.

The Dalvik virtual machine 632 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 604 include a view system 634, a resource manager 635, and content providers 637. The system services 605 includes a status bar 639; an application launcher 640; a package manager 641 that maintains information for all installed applications; a telephony manager 642 that provides an application level JAVA interface to the telephony subsystem 620; a notification manager 644 that allows all applications access to the status bar and on-screen notifications; a window manager 645 that allows multiple applications with multiple windows to share the display 401; and an activity manager 646 that runs each application in a separate process, manages an application life cycle, and maintains a cross-application history.

The applications 606 include a home application 647, a dialer application 649, a contacts application 650, a browser application 651, and backlight control application 652.

The telephony manager 642 provides event notifications (such as phone state, network state, Subscriber Identity Module (SIM) status, or voicemail status), allows access to state information (such as network information, SIM information, or voicemail presence), initiates calls, and queries and controls the call state. The browser application 651 renders web pages in a full, desktop-like manager, including navigation functions. Furthermore, the browser application 651 allows single column, small screen rendering, and provides for the embedding of HTML views into other applications.

Figure 7:
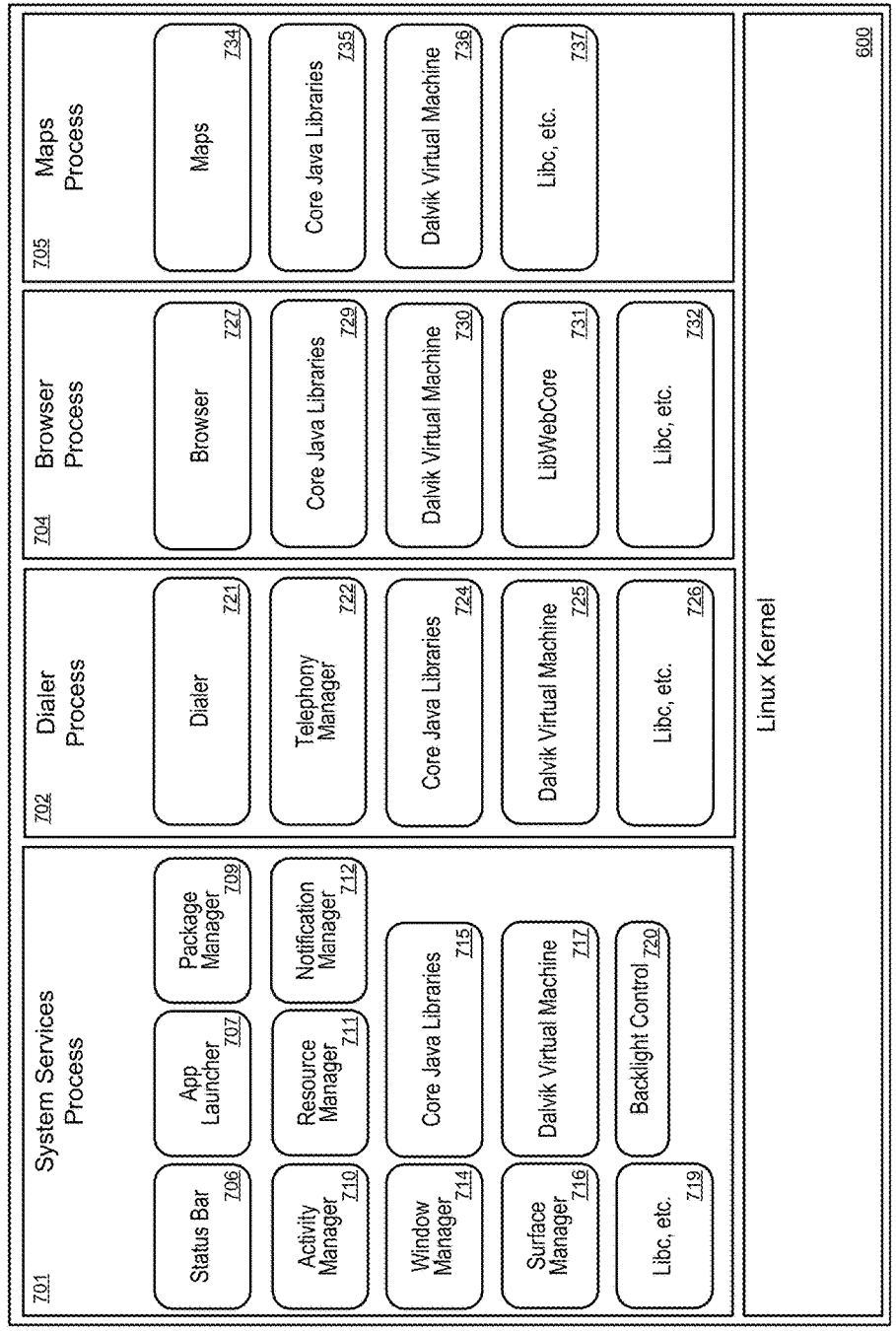
FIG. 7 is a block diagram illustrating exemplary processes implemented by the operating system kernel of FIG. 6.

FIG. 7 is a block diagram illustrating exemplary processes implemented by the operating system kernel 600. Generally, applications and system services run in separate processes, where the activity manager 646 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 716, the window manager 714, or the activity manager 710, are hosted by system processes, although application processes, such processes associated with the dialer application 721, may also be persistent. The processes implemented by the operating system kernel 600 may generally be categorized as system services processes 701, dialer processes 702, browser processes 704, and maps processes 705. The system services processes 701 include status bar processes 706 associated with the status bar 539; application launcher processes 707 associated with the application launcher 540; package manager processes 709 associated with the package manager 641; activity manager processes 710 associated with the activity manager 646; resource manager processes 711 associated with a resource manager that provides access to graphics, localized strings, and XML layout descriptions; notification manger processes 712 associated with the notification manager 644; window manager processes 714 associated with the window manager 645; core JAVA libraries processes 715 associated with the core JAVA libraries 631; surface manager processes 716 associated with the surface manager 621; Dalvik virtual machine processes 717 associated with the Dalvik virtual machine 632, LIBC processes 719 associated with the Libc library 625; and backlight control processes 720 associated with the backlight control application 652.

The dialer processes 702 include dialer application processes 721 associated with the dialer application 649; telephony manager processes 722 associated with the telephony manager 642; core JAVA libraries processes 724 associated with the core JAVA libraries 631; Dalvik virtual machine processes 725 associated with the Dalvik Virtual machine 632; and Libc processes 726 associated with the Libc library 625. The browser processes 704 include browser application processes 727 associated with the browser application 651; core JAVA libraries processes 729 associated with the core JAVA libraries 631; Dalvik virtual machine processes 730 associated with the Dalvik virtual machine 632; LIBWEBCORE processes 731 associated with the LibWebCore library 626; and Libc processes 732 associated with the Libc library 625.

The maps processes 705 include maps application processes 734, core JAVA libraries processes 735, Dalvik virtual machine processes 736, and Libc processes 737. Notably, some processes, such as the Dalvik virtual machine processes, may exist within one or more of the systems services processes 701, the dialer processes 702, the browser processes 704, and the maps processes 705.

Figure 8:
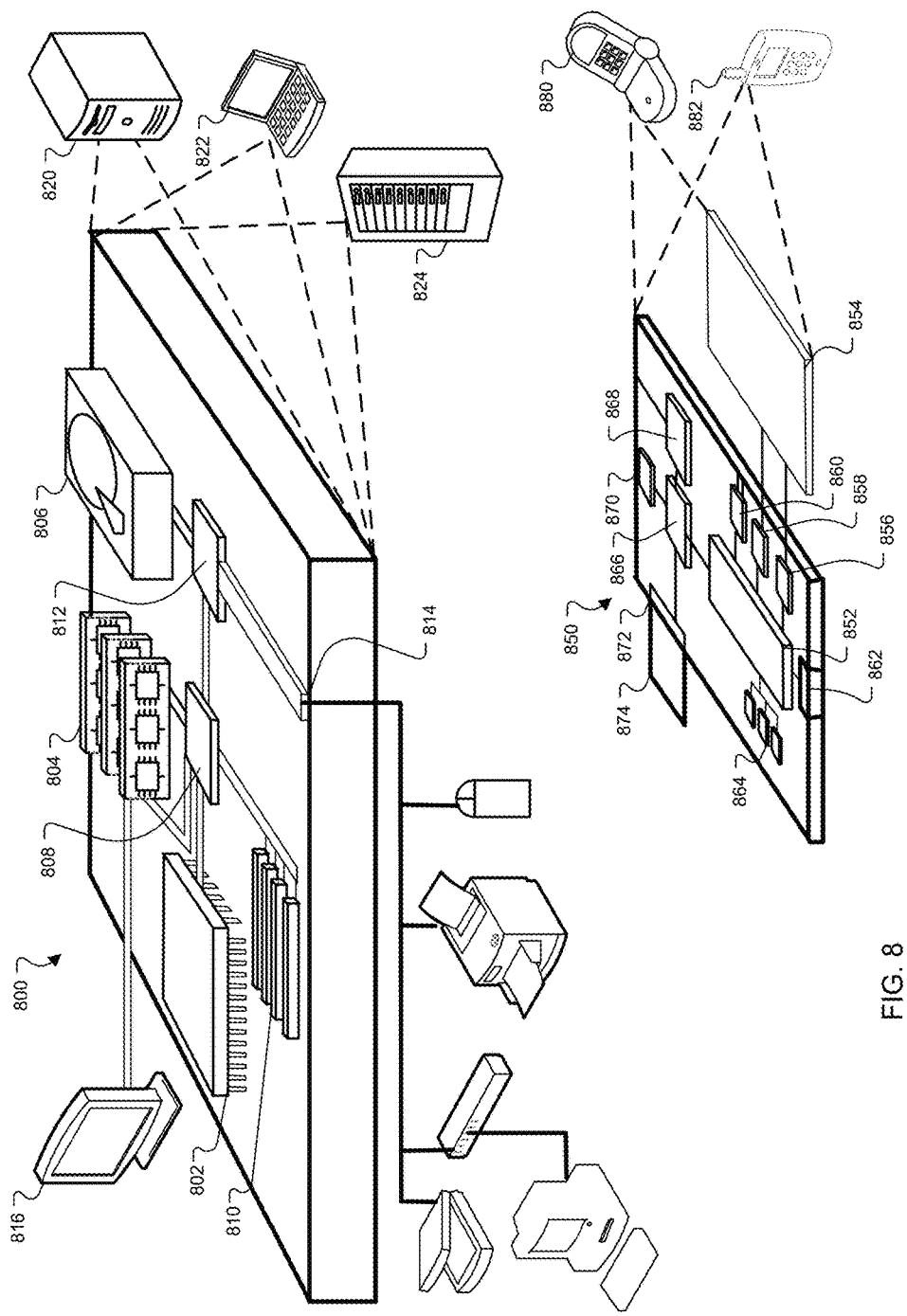
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method, comprising:
   activating a backlight of a screen of a computing device;
   starting, by the computing device, a first instance of a timer that is to limit an amount of time that the backlight is activated according to a current value of a maximum backlight activation time limit;
   identifying, by the computing device, expiration of the first instance of the timer and, in response, reducing a brightness of the backlight or deactivating the backlight;
   identifying, using a light sensor of the computing device, an ambient lighting characteristic of an environment of the computing device;
   determining, by the computing device, that the ambient lighting characteristic of the environment of the computing device satisfies a criterion for adjusting the maximum backlight activation time limit, and in response, adjusting the current value of the maximum backlight activation time limit based on the ambient lighting characteristic;
   after adjusting the current value of the maximum backlight activation time limit:
      re-activating the backlight of the screen of the computing device;
      starting, by the computing device, a second instance of the timer that is to limit an amount of time that the backlight is re-activated according to the adjusted current value of the maximum backlight activation time limit, wherein the adjusted current value of the maximum backlight activation time limit is preset before the computing device starts the second instance of the timer; and
      identifying, by the computing device, expiration of the second instance of the timer, and in response, reducing the brightness of the backlight or deactivating the backlight.

2. The computer-implemented method of claim 1, wherein:
   adjusting the current value of the maximum backlight activation time limit based on the ambient lighting characteristic of the environment of the computing device comprises adjusting the current value so as to increase the maximum backlight activation time limit as a result of identifying a relatively darker ambient lighting characteristic of the environment of the computing device; and
   the computing device is configured to adjust the current value so as to decrease the maximum backlight activation time limit as a result of identifying a relatively lighter ambient lighting characteristic of the environment of the computing device.

3. The computer-implemented method of claim 1, further comprising:
   identifying, after starting the first instance of the timer but before the first instance of the timer has expired, that user input has selected to change a current activity of the computing device; and
   in response to identifying, after starting the first instance of the timer but before the first instance of the timer has expired, that the user input has selected to change the current activity of the computing device, restarting the first instance of the timer.

4. The computer-implemented method of claim 1, wherein the computing device is a mobile computing device.

5. The computer-implemented method of claim 1, wherein reducing the brightness of the backlight or deactivating the backlight in response to identifying expiration of the first instance of the timer or expiration of the second instance of the timer comprises reducing an intensity of light output by the backlight by less than 100-percent.

6. The computer-implemented method of claim 1, wherein reducing the brightness of the backlight or deactivating the backlight in response to identifying expiration of the first instance of the timer or expiration of the second instance of the timer comprises reducing an intensity of light output by the backlight by 33-percent, 50-percent, or 75-percent.

7. A computer-implemented method, comprising:
   activating a backlight of a screen of a computing device;
   starting, by the computing device, a first instance of a timer that is to limit an amount of time that the backlight is activated according to a current value of a maximum backlight activation time limit;
   identifying, by the computing device, expiration of the first instance of the timer and, in response, reducing a brightness of the backlight or deactivating the backlight;
   identifying, by the computing device, that a first condition that is assigned to adjusting the maximum backlight activation time limit has occurred, and in response, adjusting the current value of the maximum backlight activation time limit;

after adjusting the current value of the maximum backlight activation time limit, re-activating the backlight of the screen of the computing device;

starting, by the computing device, a second instance of the timer that is to limit an amount of time that the backlight is re-activated according to the adjusted current value of the maximum backlight activation time limit;

identifying, by the computing device, expiration of the second instance of the timer, and in response, reducing the brightness of the backlight or deactivating the backlight; and wherein identifying that the first condition that is assigned to adjusting the maximum backlight activation time limit has occurred comprises:

identifying, using a clock that is accessible to the computing device, a current time of day; and determining, by the computing device, that the current time of day satisfies a criterion for adjusting the maximum backlight activation time limit.

8. A non-transitory computer-readable medium having instructions stored thereon that, when executed by one or more processors of a computing device, cause performance of operations comprising:

activating a backlight of a screen of the computing device;

starting, by the computing device, a first instance of a timer that is to limit an amount of time that the backlight is activated according to a current value of a maximum backlight activation time limit;

identifying, by the computing device, expiration of the first instance of the timer and, in response, reducing a brightness of the backlight or deactivating the backlight;

identifying, using a light sensor of the computing device, an ambient lighting characteristic of an environment of the computing device;

determining, by the computing device, that the ambient lighting characteristic of the environment of the computing device satisfies a criterion for adjusting the maximum backlight activation time limit has occurred, and in response, adjusting the current value of the maximum backlight activation time limit based on the ambient lighting characteristic;

after adjusting the current value of the maximum backlight activation time limit:

re-activating the backlight of the screen of the computing device;

starting, by the computing device, a second instance of the timer that is to limit an amount of time that the backlight is re-activated according to the adjusted current value of the maximum backlight activation time limit, wherein the adjusted current value of the maximum backlight activation time limit is preset before the computing device starts the second instance of the timer; and identifying, by the computing device, expiration of the second instance of the timer, and in response, reducing the brightness of the backlight or deactivating the backlight.

9. The non-transitory computer-readable medium of claim 8, wherein:

adjusting the current value of the maximum backlight activation time limit based on the ambient lighting characteristic of the environment of the computing device comprises adjusting the current value so as to increase the maximum backlight activation time limit as a result of identifying a relatively darker ambient lighting characteristic of the environment of the computing device; and the computing device is configured to adjust the current value so as to decrease the maximum backlight activation time limit as a result of identifying a relatively lighter ambient lighting characteristic of the environment of the computing device.

10. The non-transitory computer-readable medium of claim 8, wherein the operations further comprise:

identifying, after starting the first instance of the timer but before the first instance of the timer has expired, that user input has selected to change a current activity of the computing device; and in response to identifying, after starting the first instance of the timer but before the first instance of the timer has expired, that the user input has selected to change the current activity of the computing device, restarting the first instance of the timer.

11. The non-transitory computer-readable medium of claim 8, wherein the computing device is a mobile computing device.

12. The non-transitory computer-readable medium of claim 8, wherein reducing the brightness of the backlight or deactivating the backlight in response to identifying expiration of the first instance of the timer or expiration of the second instance of the timer comprises reducing an intensity of light output by the backlight by less than 100-percent.

13. The non-transitory computer-readable medium of claim 8, wherein reducing the brightness of the backlight or deactivating the backlight in response to identifying expiration of the first instance of the timer or expiration of the second instance of the timer comprises reducing an intensity of light output by the backlight by 33-percent, 50-percent, or 75-percent.

14. A computing device, comprising:

a screen having a backlight;

one or more processors; and a non-transitory computer-readable medium having instructions stored thereon that, when executed by the one or more processors, cause performance of operations comprising:

activating the backlight of the screen of the computing device;

starting, by the computing device, a first instance of a timer that is to limit an amount of time that the backlight is activated according to a current value of a maximum backlight activation time limit;

identifying, by the computing device, expiration of the first instance of the timer and, in response, reducing a brightness of the backlight or deactivating the backlight;

identifying, using a light sensor of the computing device, an ambient lighting characteristic of an environment of the computing device;

determining, by the computing device, that the ambient lighting characteristic of the environment of the computing device satisfies a criterion for adjusting the maximum backlight activation time limit, and in response, adjusting the current value of the maximum backlight activation time limit based on the ambient lighting characteristic;

after adjusting the current value of the maximum backlight activation time limit:

re-activating the backlight of the screen of the computing device;

starting, by the computing device, a second instance of the timer that is to limit an amount of time that the backlight is re-activated according to the adjusted current value of the maximum backlight activation time limit, wherein the adjusted current value of the maximum backlight activation time limit is preset before the computing device starts the second instance of the timer; and identifying, by the computing device, expiration of the second instance of the timer, and in response, reducing the brightness of the backlight or deactivating the backlight.

\* \* \* \* \*